United States Patent
Bhattacharya et al.

(10) Patent No.: US 11,543,783 B2
(45) Date of Patent: Jan. 3, 2023

(54) POSITION VELOCITY ASSISTED CLOCK ESTIMATION

(71) Applicant: QUALCOMM Incorporated, San Diego, CA (US)

(72) Inventors: Sumit Bhattacharya, Carlsbad, CA (US); David Tuck, San Clemente, CA (US); Naveen Kumar Bonda, San Diego, CA (US); Dominic Gerard Farmer, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 16/579,322

(22) Filed: Sep. 23, 2019

(65) Prior Publication Data

US 2020/0096949 A1   Mar. 26, 2020

Related U.S. Application Data

(60) Provisional application No. 62/735,726, filed on Sep. 24, 2018.

(51) Int. Cl.
*H04W 4/02* (2018.01)
*H04W 4/40* (2018.01)
(Continued)

(52) U.S. Cl.
CPC ............ *G04R 20/02* (2013.01); *G01S 19/256* (2013.01); *H04W 4/023* (2013.01); *H04W 4/027* (2013.01); *H04W 4/40* (2018.02)

(58) Field of Classification Search
CPC ........ G04R 20/02; H04W 4/40; H04W 4/023; H04W 4/027; H04W 4/46; G01S 19/256
See application file for complete search history.

(56) References Cited

U.S. PATENT DOCUMENTS 10,267,920 B2 * 4/2019 Ishigami ................. G01S 19/22
10,405,161 B2 * 9/2019 Mishra .................... H04L 67/12
(Continued)

FOREIGN PATENT DOCUMENTS

EP          1130415 A2   9/2001
WO     2005012935 A1   2/2005
(Continued)

OTHER PUBLICATIONS

International Search Report and Written Opinion—PCT/US2019/052643—ISA/EPO—dated Jan. 8, 2020.

*Primary Examiner* — Khawar Iqbal
(74) *Attorney, Agent, or Firm* — Thien T. Nguyen

(57) ABSTRACT

A method for maintaining timing accuracy in a mobile device includes: obtaining a range estimate using a signal received from a timing information source via a communication unit of the mobile device; obtaining position and velocity estimate information for the mobile device from a source of position and velocity information separate from the timing information source, the position and velocity estimate information being obtained from at least one sensor of the mobile device, or via a communication unit of the mobile device using a Vehicle-to-Everything wireless communication protocol, or a combination thereof; determining estimated clock parameters based on the position and velocity estimate information and the range estimate; and adjusting a clock of the mobile device based on the estimated clock parameters in response to a position-and-velocity-assisted timing uncertainty corresponding to the estimated clock parameters being below a timing uncertainty threshold.

25 Claims, 11 Drawing Sheets

(51) Int. Cl.
*G04R 20/02* (2013.01)
*G01S 19/25* (2010.01)

(56) References Cited

U.S. PATENT DOCUMENTS

| | | | |
|---|---|---|---|
| 10,838,430 B2* | 11/2020 | Guo | G01S 5/0284 |
| 10,931,317 B2* | 2/2021 | Fox | H04B 1/0096 |
| 10,982,962 B2* | 4/2021 | Mishra | G06T 7/74 |
| 11,129,029 B2* | 9/2021 | Eckert | H04W 72/02 |
| 2015/0123844 A1* | 5/2015 | Farmer | H04W 56/0035 |
| | | | 342/357.51 |
| 2015/0138015 A1* | 5/2015 | Ishigami | G01C 21/28 |
| | | | 342/357.51 |
| 2015/0185331 A1* | 7/2015 | Dai | G01S 19/43 |
| | | | 342/357.29 |
| 2018/0210090 A1* | 7/2018 | Soualle | G01S 19/40 |
| 2019/0271989 A1* | 9/2019 | Guo | G05D 1/0221 |
| 2019/0293804 A1* | 9/2019 | Venkatraman | G01S 19/23 |
| 2020/0088528 A1* | 3/2020 | Mishra | H04W 64/003 |

FOREIGN PATENT DOCUMENTS

| | | |
|---|---|---|
| WO | 2005109028 A1 | 11/2005 |
| WO | 2011143604 A2 | 11/2011 |

* cited by examiner

POSITION VELOCITY ASSISTED CLOCK ESTIMATION

CROSS-REFERENCE TO RELATED APPLICATION

This application claims the benefit of U.S. Provisional Application No. 62/735,726, filed Sep. 24, 2018, entitled "POSITION VELOCITY ASSISTED CLOCK ESTIMATION," the entire contents of which is hereby incorporated herein by reference for all purposes.

BACKGROUND

Significant advances in autonomous and semi-autonomous vehicle technologies and driver-assist features for manually driven vehicles have required that vehicles be able to determine their location, the location of other vehicles, pedestrians, and infrastructure elements proximate to the vehicle. The wireless communication protocols that support communications between the vehicle and these other entities are typically low latency network communications and may require strict time synchronization to maintain communications between wireless devices included in the vehicle and the other wireless devices present in the operating environment. Maintaining timing accuracy may be challenging. Often the wireless computing devices rely on the wireless network and/or Satellite Positioning System (SPS) (e.g., Global Navigation Satellite System (GNSS)) signals to provide a reference clock to maintain clock synchronization. However, SPS and network signals coverage may be unavailable in some areas, and the clocks of wireless computing devices relying on these signals to remain in sync will quickly drift away from a calibrated state.

SUMMARY

An example mobile device includes: a communication unit; a memory; and a processor communicably coupled to the communication unit and the memory, the processor being configured to: obtain a range estimate from a signal received, via the communication unit, from a timing information source; obtain position and velocity estimate information for the mobile device from a source of position and velocity estimate information separate from the timing information source, the processor being configured to obtain the position and velocity estimate information from at least one sensor of the mobile device, or being configured to obtain the position and velocity estimate information via the communication unit using a Vehicle-to-Everything (V2X) wireless communication protocol, or a combination thereof; determine estimated clock parameters based on the position and velocity estimate information and the range estimate; and adjust a clock of the mobile device based on the estimated clock parameters in response to a position-and-velocity-assisted timing uncertainty corresponding to the estimated clock parameters being below a timing uncertainty threshold.

Implementations of such a mobile device may include one or more of the following features. The processor is configured to adjust the clock of the mobile device in response to the position-and-velocity-assisted timing uncertainty being lower than a satellite positioning system (SPS) timing uncertainty, or the processor is configured to adjust the clock of the mobile device in response to the position-and-velocity-assisted timing uncertainty being lower than the SPS timing uncertainty and the SPS timing uncertainty being higher than the timing uncertainty threshold, or the processor is configured to adjust the clock of the mobile device in response to insufficient SPS measurements being available from which to solve for position and time. The processor is configured to make a determination that insufficient satellite measurements are available from which to solve for position and time, and the processor is configured to obtain the position and velocity estimate information in response to the determination. The V2X wireless communication protocol is a Cellular Vehicle-to-Everything (C-V2X) wireless communication protocol, the timing uncertainty threshold is associated with the C-V2X wireless communication protocol, and the processor is further configured to communicate with the timing information source using the C-V2X wireless communication protocol subsequent to adjusting the clock of the mobile device. The communication unit includes a Satellite Positioning System (SPS) receiver communicably coupled with the processor, and the timing information source includes one or more SPS satellite vehicles (SVs), one or more pseudolites, or a combination thereof, and the processor is configured to obtain the range estimate from the SPS receiver and to adjust the clock of the mobile device without requiring solving for position by the SPS receiver. The source of position and velocity estimate information includes a navigation system. The estimated clock parameters include clock drift and clock bias, both associated with the clock of the mobile device, and to adjust the clock of the mobile device, the processor is configured to compensate for the clock drift and the clock bias.

An example method for maintaining timing accuracy in a mobile device includes: obtaining a range estimate using a signal received from a timing information source via a communication unit of the mobile device; obtaining position and velocity estimate information for the mobile device from a source of position and velocity information separate from the timing information source, the position and velocity estimate information being obtained from at least one sensor of the mobile device, or via a communication unit of the mobile device using a Vehicle-to-Everything wireless communication protocol, or a combination thereof; determining estimated clock parameters based on the position and velocity estimate information and the range estimate; and adjusting a clock of the mobile device based on the estimated clock parameters in response to a position-and-velocity-assisted timing uncertainty corresponding to the estimated clock parameters being below a timing uncertainty threshold.

Implementations of such a method may include one or more of the following features. Adjusting the clock of the mobile device is performed in response to: the position-and-velocity-assisted timing uncertainty being lower than a satellite positioning system (SPS) timing uncertainty; or the position-and-velocity-assisted timing uncertainty being lower than the SPS timing uncertainty and the SPS timing uncertainty being higher than the timing uncertainty threshold; or insufficient SPS measurements being available from which to solve for position and time. The method includes making a determination that insufficient satellite measurements are available from which to solve for position and time, wherein obtaining the position and velocity estimate information is performed in response to the determination. The V2X wireless communication protocol is a Cellular Vehicle-to-Everything (C-V2X) wireless communication protocol and the timing uncertainty threshold is associated with the C-V2X wireless communication protocol. The method includes communicating with the second mobile device using the C-V2X wireless communication protocol subsequent to adjusting the clock of the mobile device.

Also or alternatively, implementations of such a method may include one or more of the following features. The timing information source includes one or more Satellite Positioning System (SPS) satellite vehicles (SVs), one or more pseudolites, or a combination thereof, and obtaining the range estimate includes an SPS receiver of the mobile device determining a number of range estimates from a number of SVs, pseudolites, or both, that is less than the number of range estimates required to determine absolute time and position information for the SPS receiver. The position and velocity information is obtained from one or more sensors of the mobile device. The position and velocity information is obtained from one or more sensors of a navigation system of a vehicle in which the mobile device is disposed. The estimated clock parameters include clock drift and clock bias associated with the clock of the mobile device, and adjusting the clock of the mobile device includes compensating for the clock drift and the clock bias.

Another example of a mobile device includes: means for obtaining a range estimate from a timing information source at a known location using a communication unit of the mobile device using a Vehicle-to-Everything (V2X) wireless communication protocol; means for obtaining position and velocity estimate information, for the mobile device from a source of position and velocity estimate information separate from the timing information source, from at least one sensor of the mobile device, or using a Vehicle-to-Everything (V2X) wireless communication protocol, or a combination thereof; means for determining estimated clock parameters based on the position and velocity estimate information and the range estimate; and means for adjusting a clock of the mobile device based on the estimated clock parameters in response to a position-and-velocity-assisted timing uncertainty corresponding to the estimated clock parameters being below a timing uncertainty threshold.

Implementations of such a mobile device may include one or more of the following features. The means for adjusting are for adjusting the clock of the mobile device in response to the position-and-velocity-assisted timing uncertainty being lower than a satellite positioning system (SPS) timing uncertainty, or the means for adjusting are for adjusting the clock of the mobile device in response to the position-and-velocity-assisted timing uncertainty being lower than the SPS timing uncertainty and the SPS timing uncertainty being higher than the timing uncertainty threshold, or the means for adjusting are for adjusting the clock of the mobile device in response to insufficient SPS measurements being available from which to solve for position and time. The mobile device includes means for making a determination that insufficient Satellite Positioning System (SPS) measurements are available from which to solve for position and time, where the means for obtaining the position and velocity estimate information are for obtaining the position and velocity estimate information in response to the determination. The wireless communication protocol is a Cellular Vehicle-to-Everything (C-V2X) wireless communication protocol, the mobile device including means for communicating with the timing information source using C-V2X subsequent to adjusting the clock of the mobile device. The timing information source includes one or more Satellite Positioning System (SPS) satellite vehicles (SVs), one or more pseudolites, or a combination thereof, the means for obtaining a range estimate are for obtaining the range estimate from an SPS receiving means of the mobile device, and the means for adjusting the clock are for adjusting the clock without requiring solving for position by the SPS receiving means. The source of position and velocity information includes one or more sensing means for determining position and velocity of the mobile device. The estimated clock parameters include clock drift and clock bias associated with the clock of the mobile device, and the means for adjusting the clock of the mobile device include means for compensating for the clock drift and the clock bias.

An example non-transitory, computer-readable medium has stored thereon computer-readable instructions for maintaining timing accuracy in a mobile device, the instructions including instructions configured to cause a computer to: obtain a range estimate from a timing information source at a known location using a communication unit of the mobile device; obtain position and velocity estimate information for the mobile device from a source of position and velocity estimate information separate from the timing information source, the instructions being configured to cause the computer to obtain the position and velocity estimate information from at least one sensor of the mobile device, or being configured to cause the computer to obtain the position and velocity estimate information via the communication unit using a Vehicle-to-Everything (V2X) wireless communication protocol, or a combination thereof; determine estimated clock parameters based on the position and velocity estimate information and the range estimate; and adjust a clock of the mobile device based on the estimated clock parameters in response to a position-and-velocity-assisted timing uncertainty corresponding to the estimated clock parameters being below a timing uncertainty threshold. The instructions configured to cause the computer to adjust the clock of the mobile device are configured to cause the computer to adjust the clock of the mobile device in response to the position-and-velocity-assisted timing uncertainty being lower than a satellite positioning system (SPS) timing uncertainty, or the instructions configured to cause the computer to adjust the clock of the mobile device are configured to cause the computer to adjust the clock of the mobile device in response to the position-and-velocity-assisted timing uncertainty being lower than the SPS timing uncertainty and the SPS timing uncertainty being higher than the timing uncertainty threshold, or the instructions configured to cause the computer to adjust the clock of the mobile device are configured to cause the computer to adjust the clock of the mobile device in response to insufficient SPS measurements being available from which to solve for position and time. The computer-readable medium includes instructions configured to cause the computer to make a determination that insufficient satellite measurements are available from which to solve for position and time, and the instructions configured to cause the computer to obtain the position and velocity estimate information are configured to cause the computer to obtain the position and velocity estimate information in response to the determination. The V2X wireless communication protocol is a Cellular Vehicle-to-Everything (C-V2X) wireless communication protocol, the timing uncertainty threshold is associated with the C-V2X wireless communication protocol, and the computer-readable medium includes instructions configured to cause the computer to communicate with the timing information source using the C-V2X wireless communication protocol subsequent to adjusting the clock of the mobile device. The timing information source includes one or more Satellite Positioning System (SPS) satellite vehicles (SVs), one or more pseudolites, or a combination thereof, the instructions configured to cause the computer to obtain the range estimate are configured to cause the computer to obtain the range estimate from an SPS receiver, and the instructions configured to cause the computer to adjust the clock of the mobile device are configured to cause the computer to adjust the clock of the mobile device without requiring solving for position by the SPS receiver. The estimated clock parameters include clock drift and clock bias, both associated with the clock of the mobile device, and the instructions configured to cause the computer to adjust the clock of the mobile device are configured to cause the computer to compensate for the clock drift and the clock bias.

BRIEF DESCRIPTION OF THE DRAWINGS

Like reference symbols in the various drawings indicate like elements, in accordance with certain example implementations.

DETAILED DESCRIPTION

Figure 1:
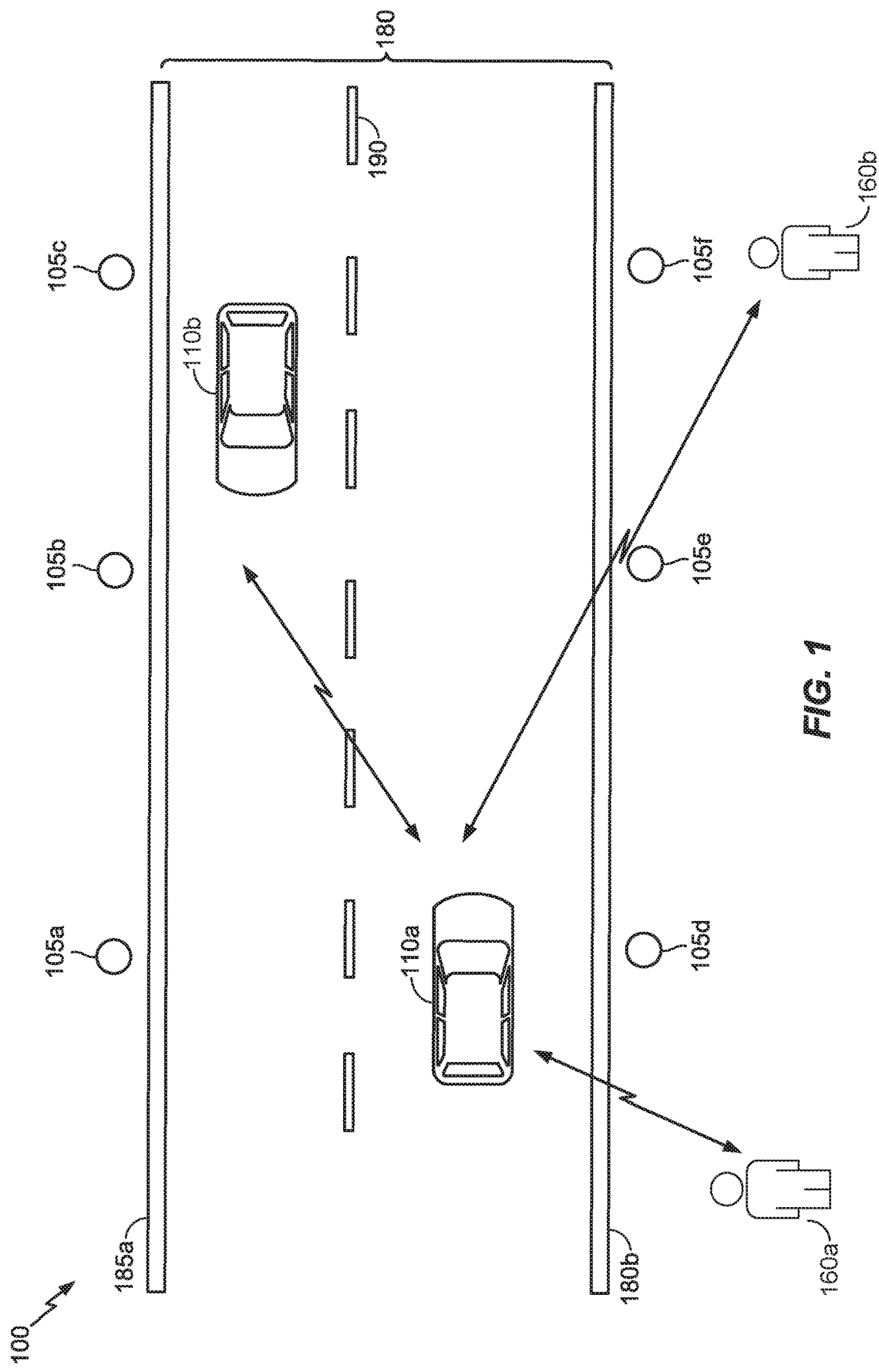
FIG. 1 is a schematic diagram of an example operating environment that illustrates an example implementation of techniques disclosed herein, in accordance with certain example implementations.

Techniques for using position and velocity to estimate clock parameters in a wireless computing device are provided. These techniques may be used to maintain timing accuracy in environments where SPS signals and/or other network signals that could otherwise be used to synchronize a clock of the wireless transmitter are unavailable or of limited availability. Techniques disclosed herein may be used to estimate clock parameters based on a position and velocity of the wireless computing device, a range to a clock information source, and a range estimate to an external timing information source at a known location. The position and velocity information may be obtained from sensors either directly or indirectly associated with the wireless device, and the range estimate may be obtained from one or more SPS space vehicles (SVs) or another source of range information. The example implementations that follow illustrate these techniques.

Techniques discussed herein may be used with wireless communication protocols that have strict time synchronization requirements to facilitate communications between wireless computing devices. For example, a Vehicle-to-Everything (V2X) wireless communication protocol, and in particular a Cellular Vehicle-to-Everything (C-V2X) wireless communication protocol may have sub-microsecond timing accuracy requirements. C-V2X technology has been standardized by the 3rd Generation Partnership Project (3GPP). C-V2X is based on the Long-Term Evolution (LTE) standards for high-speed wireless communication for mobile devices and data terminals. C-V2X is designed to connect vehicles (V2V), vehicles to roadside infrastructure (V2I), to pedestrians and other road uses (V2P), and to cloud-based network services (V2N). C-V2X provides for low-latency communications with or without network assistance, but devices using C-V2X require time synchronization to maintain communication between the wireless computing devices. For example, in V2V mode, out-of-network coverage communications require very stringent timing accuracy (e.g., approximately 391 nanoseconds). C-V2X may be used by autonomous and semi-autonomous vehicles to exchange information with other users of a navigable environment. C-V2X may be used by driver-assist features of manually driven vehicles to provide information to the driver and to driver-assist features of the vehicle.

Reference clock information is typically obtained by an SPS system or from one or more network entities associated with a wireless wide area network (WWAN) that is configured to provide network connectivity to the vehicle. However, a wireless computing device may enter into network-challenged and/or SPS-challenged areas with signals from the network and/or the SPS satellite vehicles are too weak to be utilized or unavailable for determining a reference time for keeping the clock of the wireless computing device in synch.

SPS space vehicles (SVs) provide timing information that may be used to correct for clock bias and clock drift of the clock of a wireless computing device. SPS SVs typically include one or more extremely accurate cesium and/or rubidium clocks that are much more accurate than the clocks that are commonly used in wireless computing devices, such as smart phones, smart watches, tablet computing devices, vehicle navigation and/or driving system, or other such wireless computing devices. The clocks of the SPS SVs may be subjected to network adjustments by the SPS system to keep the clocks of the SVs within the SPS system synchronized to a common reference time. The clocks used in the SPS SVs are generally too expensive and too bulky to be used for portable consumer-grade wireless computing devices such as those discussed above. SPS SVs may include satellites configured for tasks other than positioning, e.g., communication satellites configured (at least primarily) for communication whose signals may be used for positioning purposes (e.g., to determine range(s) to the satellite(s)). The SPS receiver of the wireless computing device solves for four unknowns: the coordinates of the SPS receiver in 3-D space, and time. The SPS receiver uses a line of sight to each of at least four satellites in order to determine absolute position and timing information for the wireless computing device. Obtaining line of sight to four or more satellites may present a significant challenge in many environments, where human-made structures and/or natural features of the local environment may obstruct signals from the SPS SVs. Buildings and other human-made structures in an urban environment may create "urban canyons" in which the signals from SVs are obstructed. Furthermore, parking garages, tunnels, and other similar environments also obstruct the line of sight between the wireless computing device and the SPS SVs. Mountains, hills, and/or dense foliage are also examples of some natural features that obstruct satellite signals. Accordingly, a wireless computing device may be subject to many environments where it is not possible to acquire signals from a sufficient number of SPS SVs to determine absolute position and time information accurately or at all for the wireless computing device.

Elements of wireless communication networks, such as but not limited to WWAN base stations or WLAN access points, may provide timing information that may be used to correct for clock bias and clock drift of the clock of a wireless computing device. Wireless communication carriers maintain strict timing requirements within their network and may be configured to broadcast timing information that may be used by a wireless computing device to maintain clock accuracy. However, the wireless computing device may be unable to acquire these signals and/or be subjected to poor signal quality for many of the same reasons discussed above with respect to the SPS signals.

Techniques disclosed herein may be used to determine a clock estimate in SPS-challenged and/or network-challenged environments that may be used to maintain clock synchronization to facilitate C-V2X and/or other wireless communication sessions while the wireless mobile device remains in the adverse environment. These techniques overcome the shortcomings associated with relying on SPS and wireless networks to provide time synchronization by using alternate means for maintaining time synchronization. Techniques disclosed herein may utilize a range estimate to an external timing information source from a known location and position and velocity information for the wireless computing device from a source of position and velocity information. The external timing information source may be one or more signals from SPS SVs or pseudolites. Pseudolites are typically ground-based pseudo-satellites at known locations that may transmit ranging signals similar to SPS SVs. Techniques disclosed herein may use as few as one signal from an SPS SV or pseudolite, and thus may be used in environments where the SPS receiver is unable to acquire a sufficient number of signals to determine an absolute time and position fix for the wireless computing device. Another wireless computing device at a known location may be configured to maintain strict timing synchronization of its clock. Another wireless computing device may be configured to transmit location and timing information that the wireless computing device receiving the transmission may use to determine a range to the other wireless computing device.

FIG. 1 is a block diagram of an example operating environment 100 in which techniques discussed herein may be implemented. While the example implementation illustrated in FIG. 1 illustrates an example of techniques disclosed herein implemented on a roadway, techniques disclosed herein could alternatively be implemented in other types of indoor and/or outdoor navigable environments. Furthermore, while the example implementation illustrated in FIG. 1 and those discussed in the various examples in the subsequent figures refer to vehicles, techniques disclosed herein may be utilized by wireless computing devices are that are not incorporated into a vehicle. For example, techniques disclosed herein may be utilized by wireless computing devices, such as smartphones, smartwatches, etc. that may be worn or carried by a pedestrian in such an operating environment and may be configured to support V2P communications.

The example operating environment 100 illustrates a portion of a roadway 180, but techniques disclosed herein may be utilized in other types of navigable environments. The example illustrated in FIG. 1 does not limit techniques disclosed herein to a particular configuration of the operating environment. Returning now to FIG. 1, the example roadway includes two traffic lanes demarcated by a broken center line 190 and two solid lines 185a and 185b demarcating the shoulders of the roadway. The roadway 180 is provided as an example for illustrating techniques disclosed herein. However, these techniques are not limited to this type of roadway, and may be utilized on single-lane roadways, multi-lane roadways having one-way traffic or two-way traffic, highways, expressways, toll-roads, etc. The roadway 180 has a plurality of navigational elements 105a-105f disposed along each side of the roadway 180. The navigational elements 105a-105f may provide navigational assistance data to the vehicles 110a and 110b depicted on the roadway 180 and may be configured to support V2I communications. Navigational elements 105a-105f may be disposed along the roadway and/or disposed on infrastructure elements, such as light poles, traffic signals, lane dividers, barriers, walls, sign poles, gantries, and/or other infrastructure elements that may be found along a roadway or other operating environment.

One or both of the vehicles 110a and 110b may be an autonomous or semi-autonomous vehicle. While the description herein refers to the vehicles 110a and 110b in the plural, the corresponding discussion may apply to both of the vehicles 110a, 110b, or perhaps only one of the vehicles 110a, 110b. An autonomous vehicle is configured to navigate and travel from one location to another without human input. A semi-autonomous vehicle may be configured to navigate and travel from one location to another without human input or with limited human input. A semi-autonomous vehicle may allow a driver to assume full or partial control over the navigation of the vehicle. The vehicles 110a and 110b may alternatively be a manually driven vehicle that includes driver assist features that may provide information to drivers of the vehicle and/or assume control over some vehicle components, such as braking or acceleration. The vehicles 110a and 110b may be configured to carry passengers and/or goods. The vehicles 110a and 110b may be configured to provide a steering console and controls that allows a driver to assume manual control of the vehicle. A driver may utilize vehicles on roadways that do not have the proper infrastructure in place to support autonomous navigation or for emergency situations, such as a failure of the navigation system of the vehicle or other situation requiring that manual control of the vehicle be assumed by a passenger.

The vehicles 110a and 110b may include a communication unit configured to wirelessly communicate with one another using V2V communications. The communication units of the vehicles may be configured to exchange position, velocity, acceleration, hazard and/or collision avoidance information, and/or other information directly without requiring a cellular network. The vehicles 110a and 110b may include a vehicle navigation unit configured to generate navigation information for a driver and/or for autonomous or semi-autonomous vehicle operation. The vehicles 110a and 110b may include a vehicle control unit configured to assume control over steering, braking, acceleration, and/or other aspects of vehicle operation. The communication unit may comprise a transceiver configured to support C-V2X and/or other wireless communications protocols that facilitate wireless communications between vehicles. The communication unit may include an SPS receiver that may be configured to determine a position, velocity, and time (PVT) solution for the communication unit. The SPS receiver may be configured to provide the time solution to the communication unit to enable the communication unit to keep the clock used by the communication unit synchronized with a reference clock used by the SPS system. In SPS-challenged environments where the SPS receiver is unable to acquire a sufficient number of SV signals to determine the PVT solution for the SPS receiver and no network-based reference time source is available, the communication unit may implement alternative means for estimating the clock state.

The communication unit may acquire position and velocity information from sensors included in the wireless device or external to the wireless device, such as a navigation unit or vehicle control unit of the vehicle in which the wireless device is disposed. The communication unit may acquire a range estimate from an external timing information source at a known location using a wireless receiver (which may be part of a wireless transceiver) of the wireless computing device. The range estimate may be a pseudorange estimate obtained by the SPS receiver that includes timing information for one or more satellites and/or pseudolites. The range estimate may be obtained from one or more other wireless devices, such as from the communications units of other vehicles that have current PVT information.

Figure 7:
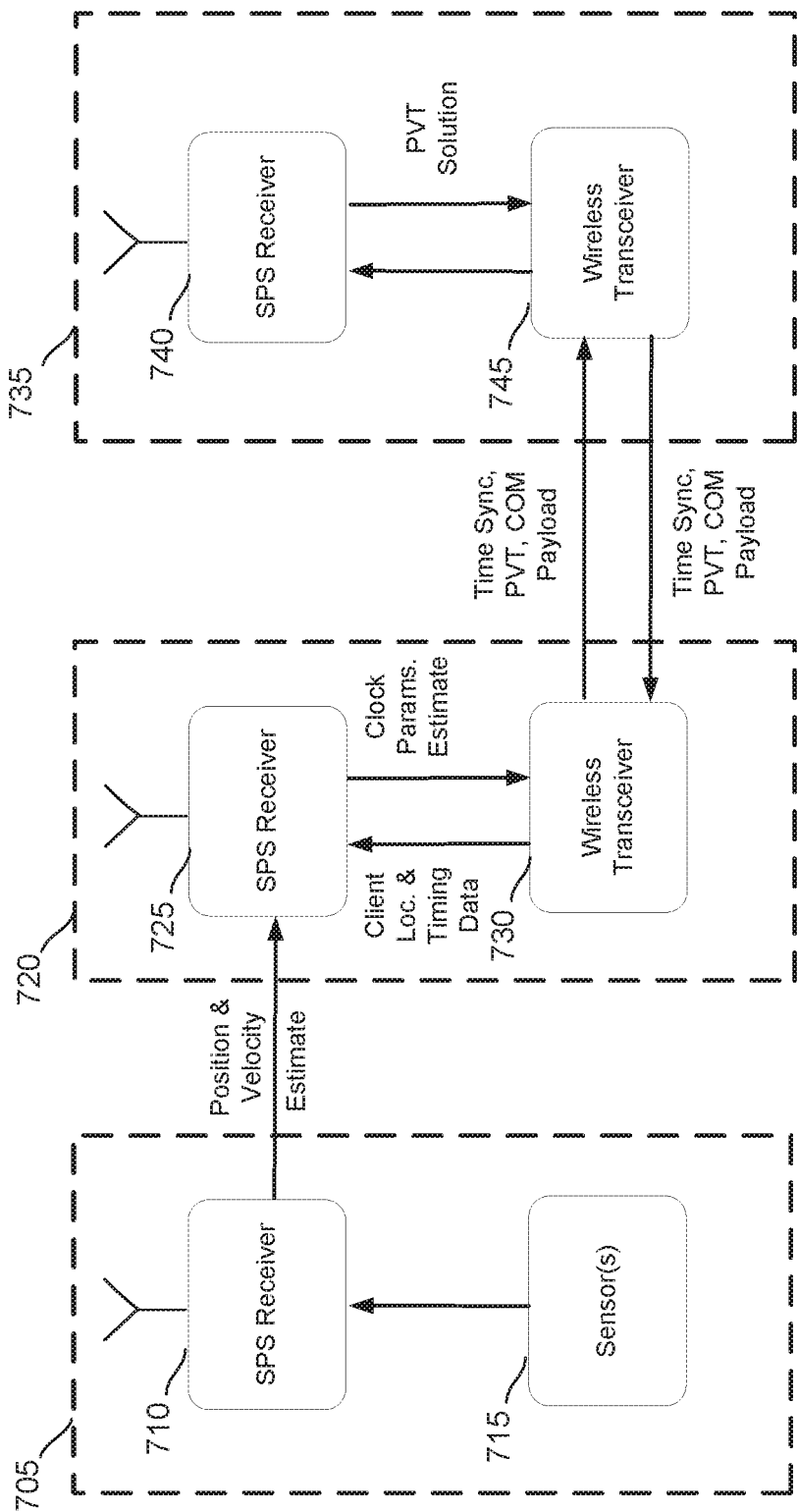
FIG. 7 is a block diagram illustrating an example of components of one or more computing devices that may be used to implement techniques disclosed herein.

The vehicle 110a and the vehicle 110b may include one or more sensors that may be used to determine the position and the velocity of the respective vehicles in which the sensors are disposed. The sensors may be implemented as components of the vehicle, the navigation unit, and/or the vehicle control unit. The specific types of sensors included in the vehicle, the navigation unit, and/or the vehicle control unit may vary from implementation to implementation. A vehicle may include accelerometers, gyroscopes, and magnetometers as well as other sensors for determining velocity and position changes of the vehicle. Some vehicles may include LiDAR and/or radar transceivers, which may be used to determine a velocity and/or position of the vehicle. Other types of vehicle-specific sensors may be used to measure how fast the vehicle is moving, such as an odometer or differential wheel ticks. An example implementation of a communication unit and a sensor-based source of position and velocity estimate information are illustrated in FIG. 7, which is described in greater detail below.

The operating environment 100 also includes two pedestrians 160a and 160b. The pedestrians may have a wireless computing device, such as a smartphone, a smartwatch or other wearable computing device, and/or other mobile wireless computing device that may be configured to use C-V2X communications. These mobile wireless computing devices may include sensors that may be used to determine a position and velocity of the mobile wireless computing device, and the mobile wireless computing device may be configured to utilize techniques discussed herein to determine estimated clock state. Furthermore, one or more infrastructure elements that include a wireless computing device may use techniques disclosed herein to determine estimated clock parameters in the event that network-based and/or SPS-based time are temporarily unavailable to these infrastructure elements. The infrastructure elements typically are at known, fixed locations, and thus may not require sensors to determine the position and velocity values.

Figure 2A:
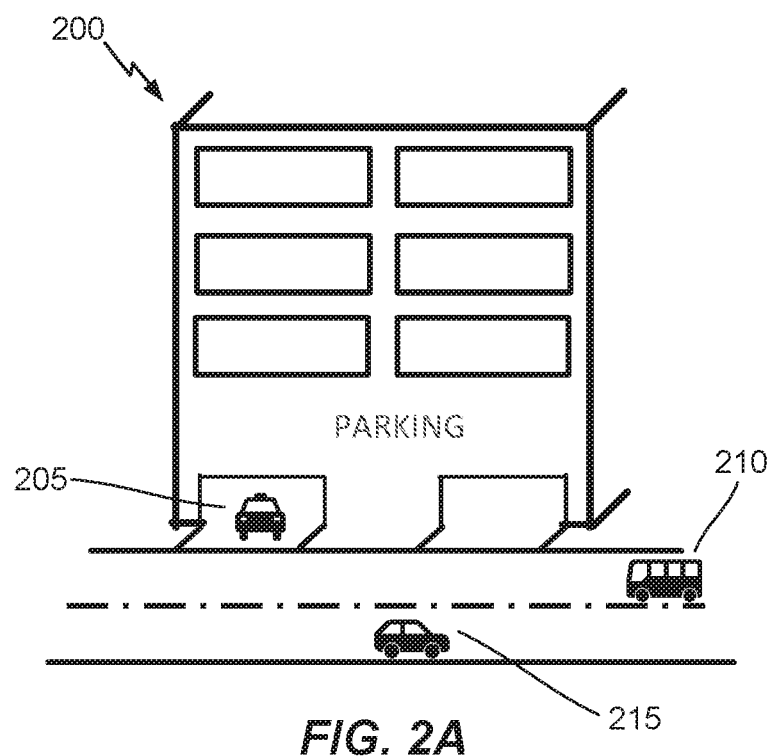
FIG. 2A is a schematic diagram of an example operating environment that illustrates an example implementation of techniques disclosed herein.
Figure 2B:
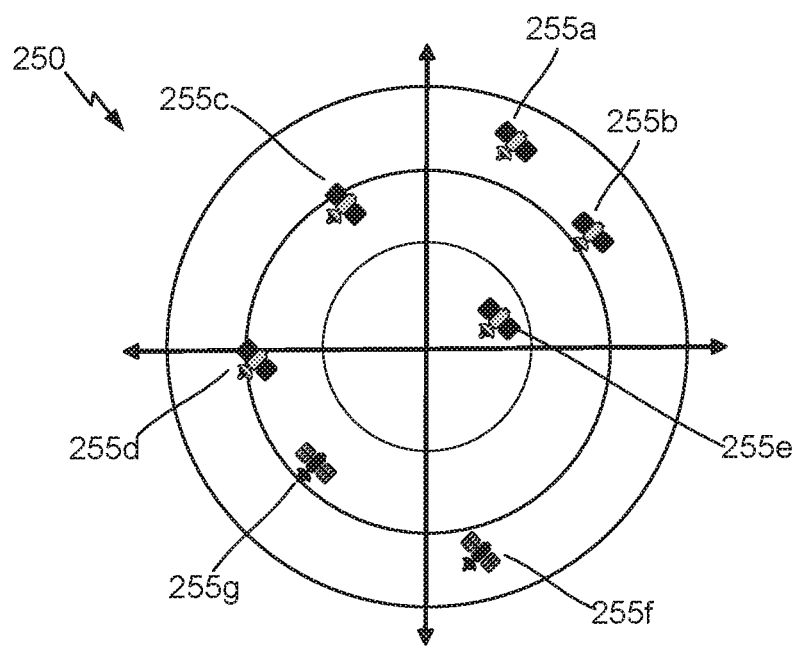
FIG. 2B is a schematic diagram of an example constellation of a Satellite Positioning System (SPS) associated with the example operating environment illustrated in FIG. 2A.

FIG. 2A is a schematic diagram of another example operating environment 200 in which aspects of techniques discussed herein may be implemented, and FIG. 2B is a schematic diagram of an example constellation 250 of a Satellite Positioning System (SPS) associated with the example operating environment illustrated in FIG. 2A. In this example operating environment, three vehicles are depicted: vehicle 205, vehicle 210, and vehicle 215. The vehicles are configured to communicate with one another using a V2V wireless communication protocol, such as C-V2X, and may exchange at least position and timing information with one another.

In this example operating environment, the vehicle 205 is exiting a parking garage in which signals from SPS SVs were obscured, and vehicle 205 also does not have network access to obtain a network-based time solution. The vehicles 210 and 215 are traveling along a roadway adjacent to the parking garage. Vehicles 210 and 215 are positioned such that their respective SPS receivers are able to acquire signals from a sufficient number of satellites to determine a PVT solution for vehicles 210 and 215. In contrast, the SPS receiver of vehicle 205 used by the communications unit is unable to acquire a sufficient number of satellites quickly enough to determine a PVT solution for the vehicle, nor is a network-based time solution available. As a result, the synchronization of the clock of the communications unit of the vehicle 205 will quickly lose synchronization with the reference clock used by vehicle 210, and vehicle 215 and will be unable to communicate with these vehicles using V2V communications unless estimated clock state may be determined.

FIG. 2B illustrates an example of a portion of an SPS satellite constellation that is potentially visible to the SPS receiver of the vehicle 205 at the time that the vehicle is exiting the parking garage. The constellation includes SVs 255a, 255b, 255c, 255d, 255e, 255f, 255g. However, structure of the parking garage and/or other surrounding structures obscure the signals from SVs 255a-e, and only SVs 255f and 255g are visible to the SPS receiver of the vehicle 205. The SPS receiver is unable to obtain a PVT solution for the vehicle using just the two available SVs.

The communications unit of the vehicle 205 may use techniques disclosed herein to determine estimated clock state to keep the clock of the communications unit of the vehicle 205 from diverging too far from a reference clock state that is being used by vehicles 210 and 215. The position and velocity of the vehicle 205 may be determined using sensor data and a range estimate to a timing information source. The clock of the timing information source may be used as a reference clock state to which the clock in the communications unit of the vehicle 205 may be synchronized. The communication unit of the vehicle 203 may use the known position and velocity of the vehicle 205 and the range information to the timing information source to calculate an estimated clock state for the clock of the communication unit. The vehicle 205 may use this estimated clock state to update the timing of the clock of the communication unit in order to maintain synchronization with the reference clock used by the communication units of the vehicles 210 and 215. In contrast, the clocks of the vehicle 210 and the vehicle 215 may be synchronized with a reference clock obtained from an SPS receiver or may alternatively obtain a reference clock state from the wireless communication network, assuming that vehicles 210 and 215 are able to acquire a network signal.

The communications unit of the vehicle 205 may be configured to obtain a range estimate from an external timing information source at a known location using a wireless receiver (which may be part of a transceiver) of the communications unit. In the example operating environment 200 illustrated in FIG. 2A, there are four possible external sources from which the range estimate may be obtained: (1) SV 255f; (2) SV 255g; (3) vehicle 210; and (4) vehicle 215. The communication unit may include an SPS receiver or be communicably coupled to an SPS receiver. The communication unit may be configured to obtain pseudorange estimates to one or both of the SVs. The communication unit may be configured to receive range information from one or both of the vehicles 210 and 215. The vehicles 210 and 215 may be configured to periodically broadcast ranging information that may be used by vehicle 205 and/or other vehicles, pedestrians, and/or infrastructure elements configured to support V2X communications protocols. The communication unit of the vehicle 205 may be configured to receive communications from these other vehicles even if the clock has become too far out of sync with the reference clock to transmit V2X communications.

The communication unit of the vehicle 205 may be configured to receive position and velocity information from a source of position and velocity information. In some implementations, the communications unit of the vehicle 205 may be configured to include one or more sensors that may be used to determine the position and velocity of the communication unit. Examples of some of the types of sensors that may be included are discussed with respect to FIG. 8. In some implementations, the source of position and velocity information may be a vehicle navigation system and/or a vehicle control unit for autonomous or semi-autonomous vehicles. The navigation system may include a separate SPS receiver other than the SPS receiver used by the communication unit and the vehicle navigation system and/or the vehicle control unit. The vehicle navigation system and/or vehicle control unit may include various types of sensors for determining a position and velocity of the vehicle. Furthermore, the vehicle navigation system and/or vehicle control unit may be configured to utilize the sensor data to estimate the position and the velocity in areas where SPS signals and network signals are weak, obscured, or both.

The communication unit may use the position and velocity estimate and the range information to solve for a time estimate. In one implementation, the SPS receiver may be used to determine one or more clock estimates. The SPS receiver may be configured to solve for four unknowns: x, y, and z coordinates in three-dimensional space and for time. However, the SPS receiver may be configured to receive values for one or more of these unknown values and solve for the remaining unknown values. In techniques disclosed herein, the 3D position of the vehicle and the velocity of the vehicle may be determined from the sensor data or other position and velocity estimate source. This leaves a single unknown variable: time. However, this unknown value may be solved for based on the PV information for the vehicle 205 and range information between the position of the vehicle 205 and an external timing information source at a known location. This calculation is discussed in greater detail with regard to the processes illustrated in FIGS. 9-14 that follow.

Figure 3:
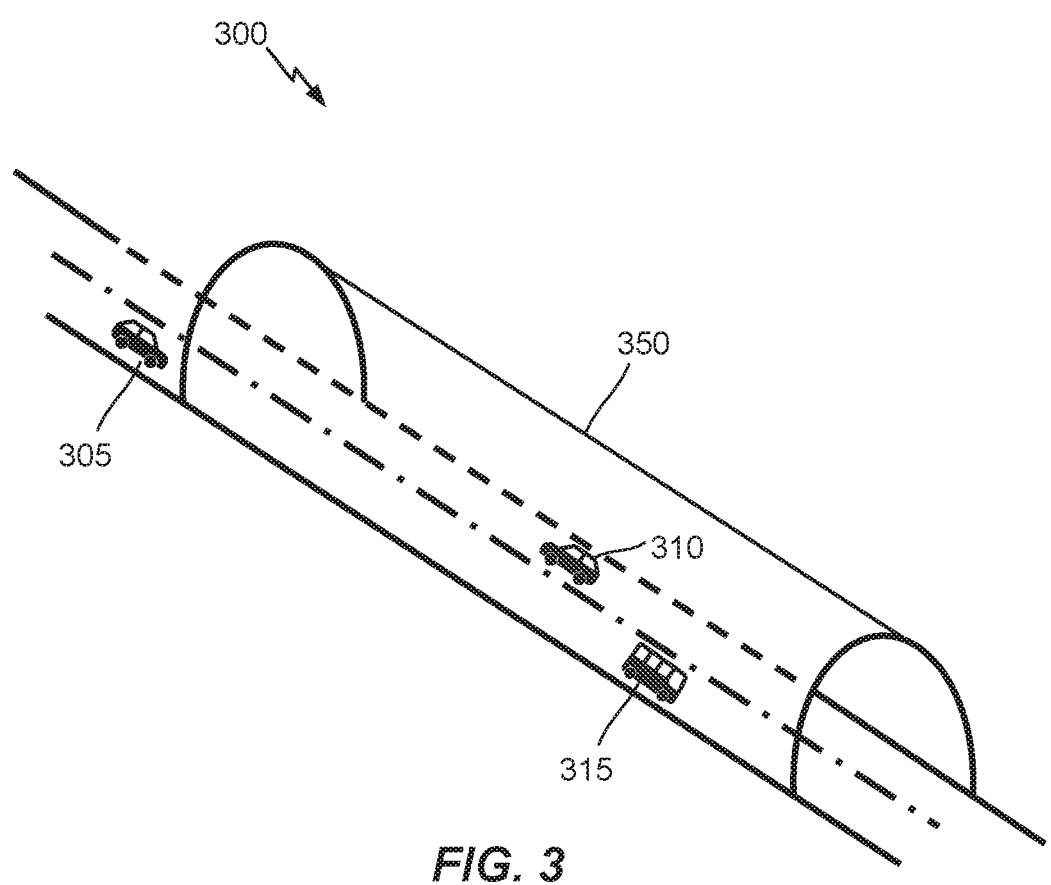
FIG. 3 is a schematic diagram of another example operating environment 300 in which aspects of techniques discussed herein may be implemented.

FIG. 3 is a schematic diagram of another example operating environment 300 in which aspects of techniques discussed herein may be implemented. In this example operating environment, vehicle 305 is on a roadway approaching a tunnel 350. Vehicle 305 has wireless wide area network (WWAN) coverage as well as SPS coverage. Accordingly, vehicle 305 may rely on network-based and/or SPS-based time synchronization. Vehicle 310 and vehicle 315 have entered a tunnel 350, and have no mobile wireless network coverage or SPS coverage, because the tunnel 350 has blocked the network and SPS signals. Accordingly, vehicle 310 and vehicle 315 cannot rely on network-based or GNNS-based time synchronization.

Vehicle 310 and vehicle 315 may use techniques disclosed herein to estimate clock state that help maintain their respective clocks synchronized with the reference time utilized for V2X communications. Vehicle 310 and vehicle 315 may rely on the vehicle 305 as an external timing information source at a known location. Vehicle 310 and vehicle 315 may calculate their respective positions and velocities using onboard sensors and may obtain respective range estimate from their respective positions to vehicle 305. The time estimates for vehicle 310 and vehicle 315 may then be determined, which may be used to keep their clocks in sync with the reference time while the vehicles 310 and 315 remain in the tunnel 350. Once the vehicles 310, 315 have exited the tunnel 350, network coverage by the WWAN and coverage by the SPS satellites is likely to be available once again, and the vehicles 310, 315 may once again rely on network-based or SPS-based time synchronization techniques. Otherwise, should limited WWAN coverage be available and should an insufficient number of SPS SVs be visible for an SPS-based solution, the vehicles 310, 315 may continue to use the clock estimate techniques disclosed herein to continue to maintain their clocks in sync for V2X or other types of wireless communications.

Figure 4:
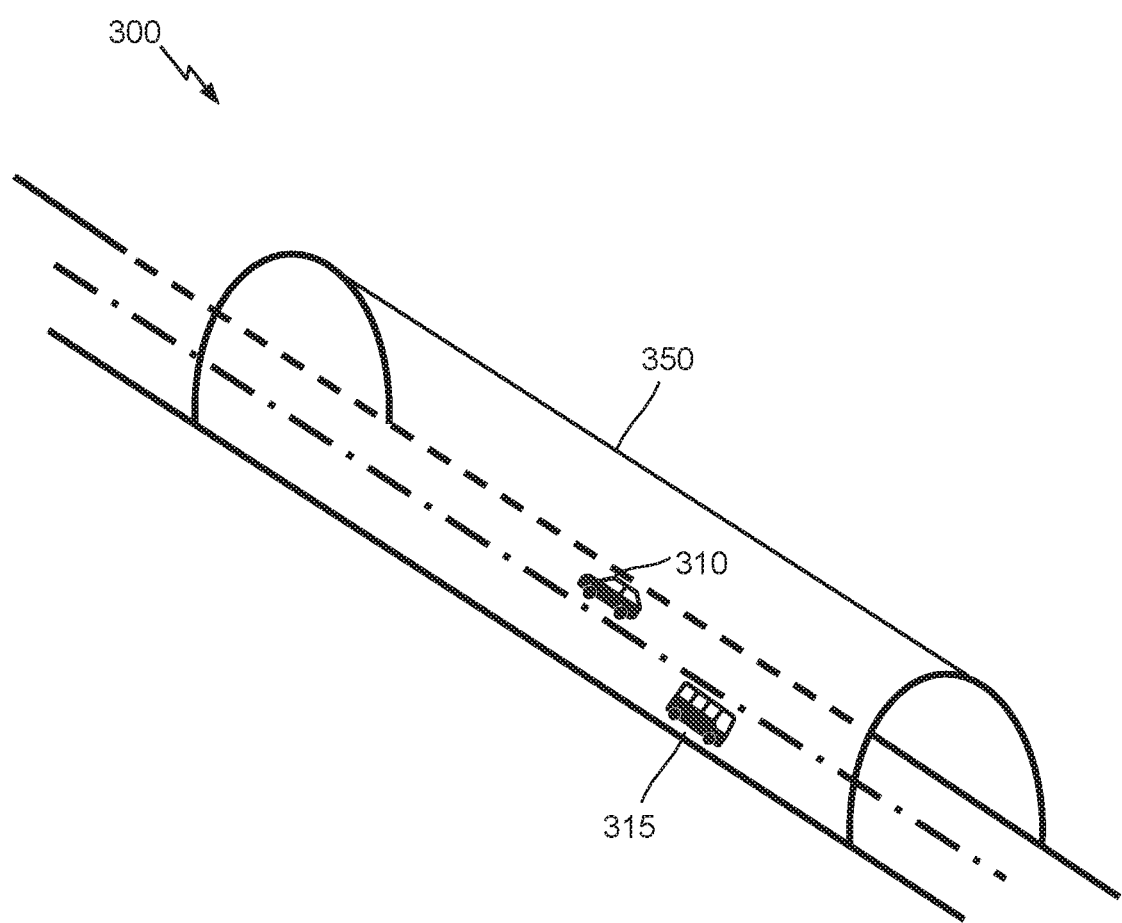
FIG. 4 is a schematic diagram of the example operating environment illustrated in FIG. 3 in which aspects of techniques discussed herein may be implemented.

FIG. 4 is a schematic diagram of another example operating environment 300 illustrated in FIG. 3 in which aspects of techniques discussed herein may be implemented. FIG. 4 illustrates a variant of the operating environment 300 illustrated in FIG. 3 in which the vehicle 305 is omitted, and vehicle 310 and 315 have entered into the tunnel 350 and have no mobile wireless network coverage or SPS coverage. No network-based or SPS-based reference time source is available to vehicle 310 and vehicle 315. However, the vehicle 310 and vehicle 315 establish peer-to-peer communications in which the clocks of the vehicles 310 and 315 may remain synchronized and would share a clock bias. This approach may not satisfy the requirements of wireless communication protocols that have strict time synchronization requirements to facilitate communications between wireless computing devices, such as C-V2X, but may enable vehicle 310 and vehicle 315 to maintain communications while in the tunnel 350.

In the example implementation illustrated in FIG. 4, vehicle 310 may exchange messages with the vehicle 315 indicating that each respective vehicle does not have a network-based or SPS-based time reference. Vehicle 310 and/or vehicle 315 may be configured to determine their respective estimated positions and velocities using sensor-based systems responsive to determining that no network-based or SPS-based time reference is available. Each vehicle may transmit a message that includes their estimated position and velocity (PV). The message may include a current clock state.

The vehicles 310 and 315 may negotiate a bias value to be used for the peer-to-peer communication session. In one implementation, a first vehicle (e.g., vehicle 310 in this example) transmits the message that includes the estimated PV and current clock state, and the second vehicle receiving the message (e.g., vehicle 315 in this example) may be configured to determine a clock bias value that is the difference between the clock state the first and second vehicles. This difference may be determined based the range between the first and second vehicles at the time that the message was transmitted, and the current clock state included in the message. The second vehicle may use this range information to determine what the clock state of the second vehicle was at the time that the message was transmitted by the first vehicle, and determine the clock bias value by calculating the difference between these two values. The second vehicle may use the clock bias value to update the clock of the second vehicle so that the clocks of the first and second vehicles remain sufficiently synchronized to continue peer-to-peer communications using V2V communications protocols. The second vehicle may be configured to transmit a message that includes an estimated PV and current clock state once the second vehicle has updated is clock. The first vehicle may be configured to receive this message and to determine based on the PV and current clock state that the clock of the second vehicle is synchronized with that of first vehicle for the purposes of peer-to-peer communications. In some implementations, the second vehicle may transmit a message to the first vehicle expressly indicating that the second vehicle has adjusted its clock state to facilitate a peer-to-peer session with the first vehicle while the network and SPS coverage are unavailable.

Assuming that the two vehicles remain within communication range of one another, once one of the vehicles (e.g., vehicle 315) reaches a position where either network-based or SPS-based time reference information may be obtained, that vehicle (e.g., vehicle 315 in this example) may update its clock with time reference information and may serve as a time reference source with the other vehicle (e.g., vehicle 310 in this example).

Alternatively, the two vehicles may be configured to determine an intermediate bias value and both vehicles may be configured to update their respective clocks using the average bias information. For example, the vehicle determining the clock bias information (e.g., vehicle 315 in this example) may be configured to determine an average of the clock state of the first vehicle and of the second vehicle, and determine a first bias value for the first vehicle and a second bias value for the second vehicle. The second vehicle may transmit the first bias value to the first vehicle so that the first vehicle may update its clock accordingly, and the second vehicle may update its clock using the second bias value.

Figure 5:
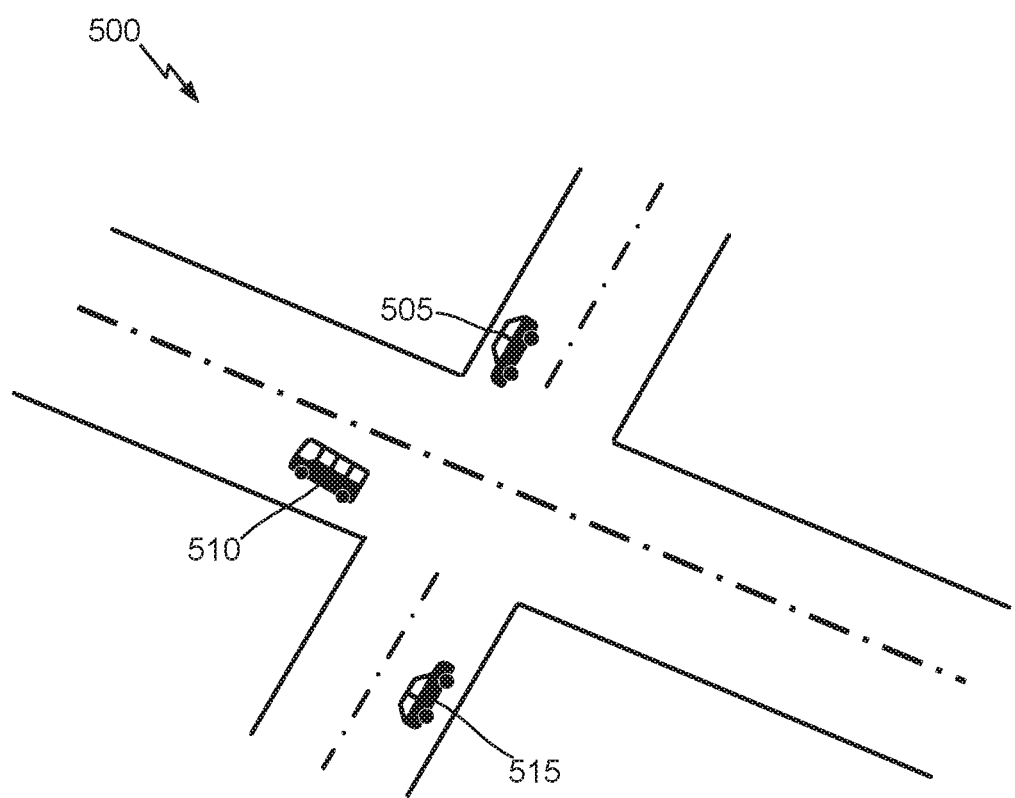
FIG. 5 is a schematic diagram of another example operating environment in which aspects of techniques discussed herein may be implemented.

FIG. 5 is a schematic diagram of another example operating environment 500 in which aspects of techniques discussed herein may be implemented. In the example operating environment illustrated in FIG. 5, there are three vehicles: vehicle 505, vehicle 510, and vehicle 515. In this example, none of the vehicles have access to an SPS-based or network-based time reference. Each of the three vehicles may be configured to determine their respective estimated positions and velocities using sensor-based systems responsive to determining that no network-based or SPS-based time reference is available. Each vehicle may transmit a message that includes their estimated position and velocity (PV). The message may include a current clock state. The message may be similar to those exchanged discussed above with respect to the example operating environment of FIG. 4.

In the example illustrated in FIG. 5, the vehicles may be configured to negotiate a clock bias value. In some implementations, the clock bias value may be determined based on a current clock state of a first vehicle to transmit a PV estimate and current clock information (e.g., vehicle 505 in this example) as discussed above, and the second and third vehicles (e.g., vehicles 510 and 515 in this example) may be configured to determine a respective clock bias value and to adjust their respective clocks accordingly. The second and third vehicle may be configured to implicitly confirm that they have updated their clocks to synchronize with the first vehicle by sending a message comprising estimated PV information and current clock state. The second and third vehicles may be configured to transmit messages that their clocks have been synchronized with that of the first vehicle for the purposes of peer-to-peer communications. Alternatively, one of the vehicles (e.g., vehicle 505) may be configured to determine an average clock state based on the current clock value information transmitted by the other two vehicles (e.g., vehicles 510 and 515 in this example). The vehicle may determine a bias value for its respective clock and update the clock accordingly. The vehicle may transmit the average clock information to each of the other vehicles. The vehicle may be configured to calculate a clock bias for each of the vehicles and to transmit the clock bias to each of the other vehicles. The other two vehicle may update their clocks accordingly. The example illustrated in FIG. 5 may satisfy the strict timing requirements of V2V protocols, such as C-V2X and may allow the vehicles to continue a V2V/V2X communication session without reverting to a peer-to-peer session because each of the three vehicles is configured to adhere to the V2V/V2X communication protocols and had been relying on a network-based on SPS-based time reference before entering the area that lacked network and SPS coverage.

Figure 6:
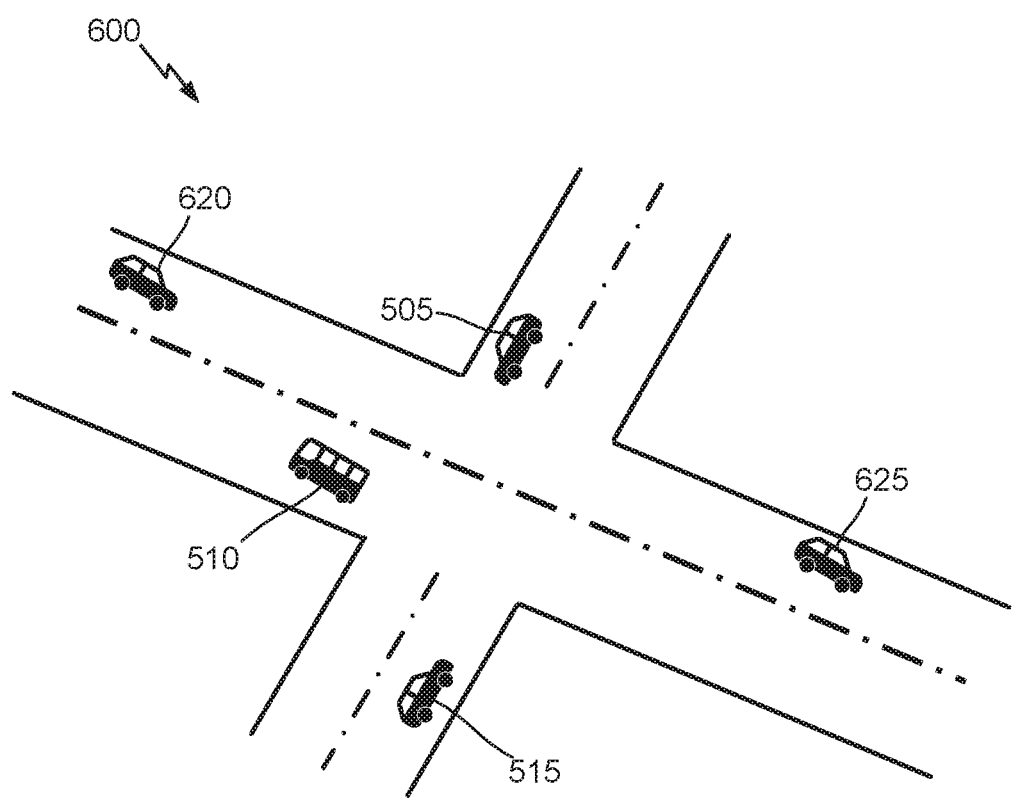
FIG. 6 is a schematic diagram of the example operating environment illustrated in FIG. 5 in which aspects of techniques discussed herein may be implemented.

FIG. 6 is a schematic diagram of another example operating environment 600 illustrated in FIG. 5 in which aspects of techniques discussed herein may be implemented. In the example illustrated in FIG. 6, an additional two vehicles 620 and 625 are present that were not present in FIG. 5. The vehicle 510 may not have a known location, however the presence of at least four other vehicles with known PV may allow the vehicles to solve for time as in the preceding examples and/or to solve for position of vehicle 510. In this example as in the preceding example, each of the vehicles are configured to communicate using V2V protocols, such as C-V2X, and none of the vehicles have access to an SPS-based or network-based time reference. Each of the vehicles may be configured to estimate their respective estimated positions and velocities as discussed above and may then solve for time to determine a clock bias as discussed above.

However, with five or more vehicles, a vehicle (e.g., vehicle 510 in this example) may use range, bearing, or angle of arrival information from each of the other vehicles (e.g., vehicle 505, vehicle 515, and vehicle 620) to trilaterate or triangulate the position of the vehicle 510. In this example, assume that the vehicle 510 does not have sensors or another reliable source of PV information. However, vehicle 505, vehicle 515, vehicle 620, and vehicle 625 are each able to obtain a PV estimate. The vehicle 510 may use the range, bearing, or angle of arrival information and PV information from the other vehicles to solve both for position and time. The position of vehicle 510 may be determined based on the ranges, bearing, or angle of arrival to the vehicle 505, vehicle 515, vehicle 620 and vehicle 625, which have reliable estimated positions. Once the position of the vehicle 510 is estimated based on the ranges, bearing, or angle of arrival to the other vehicles, then the time may be estimated as in the preceding examples where a clock bias is determined. While the example illustrated in FIG. 6 involves includes just five vehicles, more than four vehicles could be utilized if those vehicles are configured to support V2V and techniques disclosed herein.

FIG. 7 is a block diagram illustrating an example of components of one or more computing devices that may be used to implement techniques disclosed herein. The example implementation illustrated in FIG. 7 includes a source of position and velocity estimate information 705. The source of position and velocity estimate information 705 includes an SPS receiver 710 and/or one or more sensors 715 in this example implementation. The example implementation also includes a communication unit 720 that includes an SPS receiver 725 and a transceiver 730. The example implementation also includes a client device 735 that includes an SPS receiver 740 and a transceiver 745.

The communication unit 720 and the source of position and velocity estimate information 705 are illustrated as separate components. However, in some implementations, the functionality of the communication unit 720 may be combined with some or all of the functionality of the source of position and velocity estimate information 705 described herein. Furthermore, the communication unit 720 and the source of position and velocity estimate information 705 may both be components of a computing device disposed in a vehicle, such as but not limited to an onboard computing system, a navigation system, a vehicle control system, or a combination thereof. In other implementations, the communication unit 720 and the source of position and velocity estimate information 705 may be implemented in a mobile wireless computing device, such as a smartphone, smartwatch, or other mobile wireless computing device. Such a mobile wireless computing device could, for example, be used by a pedestrian in a C-V2X environment.

The communication unit 720 may be configured to use the transceiver 730 to facilitate V2X communications with V2X capable devices, such as the client device 735. The client device 735 may also be a mobile wireless device associated with a vehicle (V2V), such as but not limited to an onboard computing system, a navigation system, a vehicle control system, or a combination thereof. The client device 735 may be a mobile wireless device associated with a pedestrian (V2P). The client device 735 may also be a network entity (V2N), such as a wireless base station or wireless access point. The client device 735 may also be an infrastructure element (V2I), such as but not limited to a navigational marker. The client device 735 may be used as an external timing information source from which a range estimate may be obtained where a PVT solution is available for the client device 735.

The communication unit 720 and the client device 735 may be configured to exchange various information. The information may include, but is not limited to, time synchronization information, communications payloads content, and position, velocity, and time (PVT) information. The PVT information may be used by the device receiving the information to determine a range from the device transmitting the information to the device receiving the information. In an SPS-challenged and/or network-challenged environment, such as but not limited to those discussed in the preceding examples, the communication unit 720 and the client device 735 may utilize techniques disclosed herein for solving for time to determine clock bias information and updating their respective clocks to maintain a clock state that is synchronized relative to a the clock of a nearby V2X device. Furthermore, as indicated in the preceding examples, the communication unit 720 may be configured to communicate with multiple client devices 735 in order to determine clock parameters and position.

The communication unit 720 may include an SPS receiver 725 that may be used to determine PVT solutions for the communication unit 720. The communication unit 720 may comprise a processor that is configured to perform the various actions described as being performed by the communication unit 720. The processor may be a standalone processor that is communicably coupled to the SPS receiver 725 and the transceiver 730. Alternatively, the processor may be a component of the SPS receiver 725 or the transceiver 730.

The communication unit 720 may be configured to use the time information from the PVT solution to maintain a clock of the transceiver 730 in sync with a reference clock. The reference clock may be used by network elements, such as wireless access points and/or base stations, and by other mobile devices to maintain a reference clock state used to synchronize wireless communications. The SPS receiver 725 may output a reference time value that may be used to synchronize the clock of the transceiver 730 in sync with the other wireless devices, such as the client device 735. The communication unit 720 may be configured to obtain a reference time value from a WWAN base station, a WLAN access point, and/or other network element. However, as discussed in the preceding examples, SPS and network availability may be limited in certain areas. Accordingly, the communication unit 720 may be configured to obtain a range estimate from an external timing information source and position and velocity estimate information from a position and velocity estimate source.

In the example of FIG. 7, the SPS receiver 725 may be able to obtain one or more pseudorange estimates for SPS SVs, but the number of pseudorange estimates is insufficient to determine a PVT solution for the communication unit 720. The SPS receiver 725 may be able to obtain time reference information from the client device 735 while the client device 735 has network coverage, may be able to acquire a sufficient number SPS SV signals using SPS receiver 740 to determine a PVT solution for the client device 735, or both. The client device 735 may be configured to transmit the time reference information using the wireless transceiver 745, and the time reference information may be included as part of a C-V2X message that is transmitted by the client device 735.

In the example of FIG. 7, the source of position and velocity estimate information 705 may provide position and velocity information to the communication unit 720. The source of position and velocity estimate information 705 may include sensors 715 and SPS receiver 710. The source of position and velocity estimate information 705 may be configured to use the SPS receiver 710 to determine a PVT solution where a sufficient number of SPS SV signals may be acquired by the SPS receiver 710. However, the source of position and velocity estimate information 705 may be configured to utilize the sensors 715 to estimate position and velocity in situations where an insufficient number of SPS SV signals may be acquired. Examples of some of the types of sensors that may be included are discussed with respect to FIG. 8. The source of position and velocity estimate information 705 may be configured to use sensor data obtained from the sensors 715 responsive to determining that the SPS receiver 710 is unable to acquire a sufficient number of SV signals to determine a PVT solution. The source of position and velocity estimate information 705 may also include a wireless transceiver (not shown) that may be used to acquire time reference information.

The communication unit 720 may be configured to use the position and velocity information obtained from the position and velocity estimate information 705 and a range estimate to an SV or the client device 735 to determine an estimated clock state that may be used to synchronize the clock of the transceiver 730. This technique may be used to maintain synchronization of the clock used by the transceiver 730 in network-challenged and SPS-challenged environments allowing the communication unit 720 communicate with other wireless computing devices, such as client device 735, using wireless communication protocols that require strict time synchronization, such as but not limited to C-V2X.

The communication unit 720 may provide means for obtaining a range estimate from an external timing information source at a known location using a wireless transceiver of the wireless computing device, means for obtaining position and velocity estimate information for the wireless computing device from a source of position and velocity information, means for determining estimated clock parameters based on the position and velocity estimate information and the range estimate, and means for updating a clock of the wireless computing device based on the estimated clock parameters. The communication unit 270 may provide means for communicating with a second wireless computing device using C-V2X subsequent to updating the clock of the wireless computing device. The communication unit 720 may comprise means for sensing position and velocity of the communication unit 720 and/or means for obtaining position and velocity of the communication unit 720 from an external sensing means. The communication unit 720 may comprise means for determining the estimated clock parameters based on the position and velocity estimate information and the range estimate which further comprises means for providing the position and velocity estimate information to an SPS receiver of the wireless computing device and means for obtaining the estimated clock parameters from the SPS receiver responsive to providing the position and velocity estimate information. The communication unit 720 may comprise means for updating the clock of the wireless computing device which comprises means for compensating for the clock drift and the clock bias.

In some implementations, the communication unit 720 may comprise a hardware processing means for implementing the various means discussed herein. The hardware processing means may be a standalone processing means comprising means for communicating with the SPS receiver 725 or the transceiver 730, or the hardware processing means may comprise a hardware processing means the SPS receiver 725 or the transceiver 730. The hardware processing means may be configured to execute program code stored in a non-transitory, computer-readable memory of the communication unit 720. The memory may be a component of the SPS receiver 725 or the transceiver 730.

Figure 8:
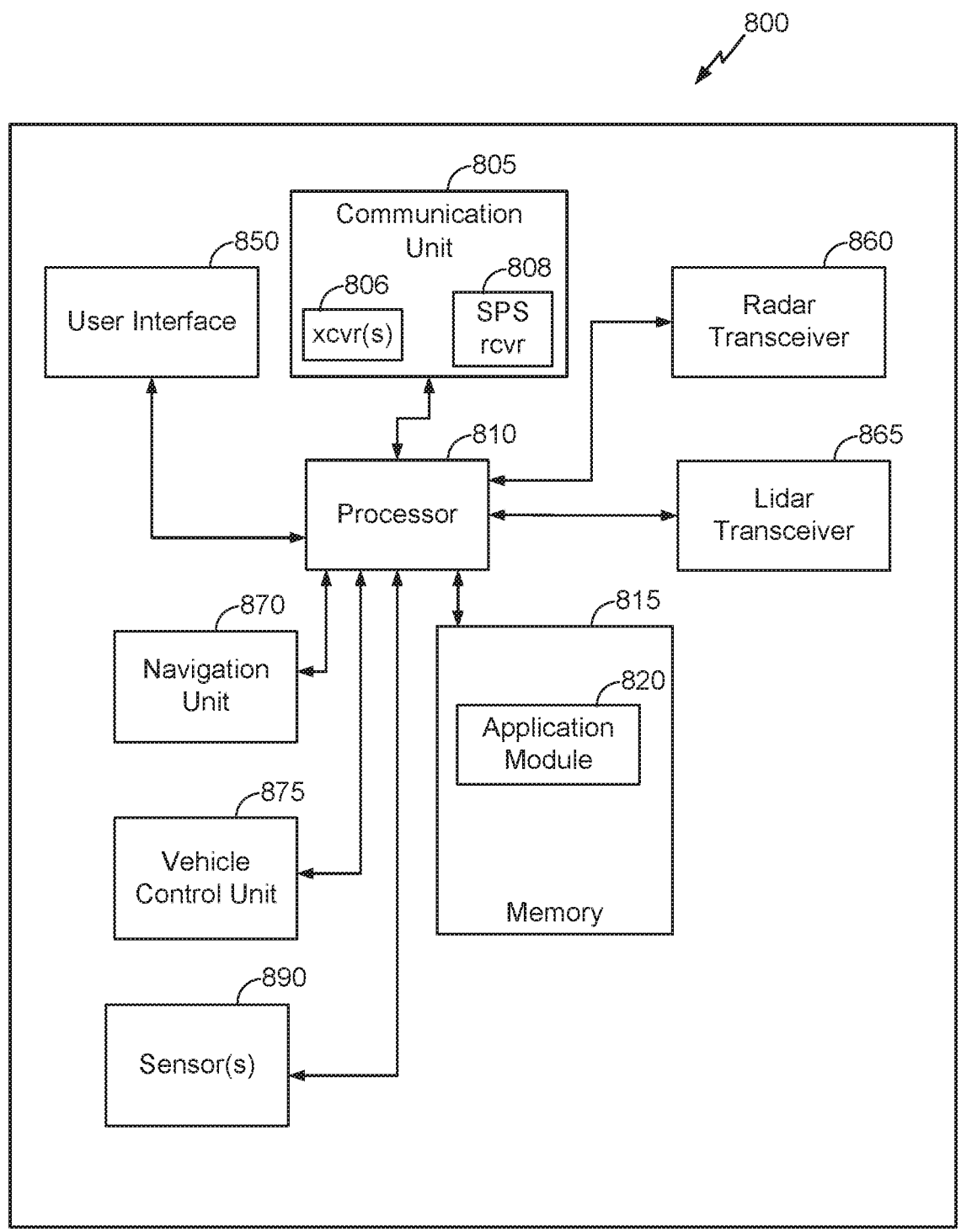
FIG. 8 is a block diagram of an example wireless computing device that may be used to implement the wireless communications devices in the preceding figures.

FIG. 8 is a block diagram of an example computing device 800 that may be used to implement the wireless communications devices in the preceding figures. In some implementations, the computing device 800 may be used to implement a navigational and/or control system for various types of autonomous or semi-autonomous vehicles, drones, or other devices. The computing device 800 may be an in-vehicle computer system that may provide network connectivity for downloading network content and application, navigational data, and/or other content that may be viewed or executed using the computing device 800. In other implementations, the computing device 800 may be a smartphone, a smartwatch or other wearable computing device, and/or other mobile wireless computing device. For mobile device implementations, some components of the computing device 800 may be omitted, such as the radar transceiver 860, the lidar transceiver 865, and the vehicle control unit 875. The computing device 800 may be any of a variety of devices such as a smartphone configured to interact with a vehicle via a CAM, or other bus, or a wireless interface. The computing device 800 may be built into a vehicle or be a vehicle such as an automobile, a motorcycle, a scooter, a bicycle, a bus, a truck (e.g., a tractor such as a semi), a drone, a robotic platform, etc. These are examples only and the computing device 800 may be configured in other forms.

For the sake of simplicity, the various features/components/functions illustrated in the schematic boxes of FIG. 8 are connected together using a common bus to represent that these various features/components/functions are operatively coupled together. Other connections, mechanisms, features, functions, or the like, may be provided and adapted as necessary to operatively couple and configure a navigational and driving control system. Furthermore, one or more of the features or functions illustrated in the example of FIG. 8 may be further subdivided, or two or more of the features or functions illustrated in FIG. 8 may be combined. Additionally, one or more of the features or functions illustrated in FIG. 8 may be excluded.

As shown, the computing device 800 may include a communication unit 805 that may be configured to provide wired and/or wireless network connectivity to the computing device 800. The communication unit may include one or more local area network transceivers that may be connected to one or more antennas (not shown). The one or more local area network transceivers comprise suitable devices, circuits, hardware, and/or software for communicating with and/or detecting signals to/from one or more of the wireless local-area network (WLAN) access points, and/or directly with other wireless devices within a network. The communication unit 805 may include, in some implementations, one or more wide area network (WWAN) transceiver(s) 806 that may be connected to the one or more antennas (not shown). The wide area network transceiver may comprise suitable devices, circuits, hardware, and/or software for communicating with and/or detecting signals from one or more of, for example, the wireless wide-area network (WWAN) access points and/or directly with other wireless devices within a network. The communication unit may include a C-V2X communication means for communicating with other C-V2X capable entities. The WLAN transceiver of the computing device may be configured to provide the C-V2X communication means.

The communication unit 805 may include an SPS receiver 808. The SPS receiver 808 may be connected to the one or more antennas (not shown) for receiving signals from SPS SVs and/or pseudolites. The SPS receiver 808 may comprise any suitable hardware and/or software for receiving and processing SPS signals. The SPS receiver 808 may request information as appropriate from the other systems and may perform computations to determine the position of the computing device 800 using, in part, measurements obtained by any suitable SPS procedure. The positioning information received from the SPS receiver 808 may be provided to the navigation unit 870 for determining a location of the platform in which the computing device 800 is disposed and for navigating the vehicle along a roadway or other navigable area. The SPS receiver 808 may be used to provide one or more range estimates for determining estimated clock parameters where the SPS receiver 808 is unable to acquire a sufficient number of SV and/or pseudolite signals to determine a PVT solution for the computing device 800.

The processor(s) (also referred to as a controller) 810 may be connected to the memory 815, the navigation unit 870, the vehicle control unit 875, the user interface 850, the communication unit 805, the radar transceiver 860, and the LiDAR transceiver 865. The processor 810 may include one or more microprocessors, microcontrollers, and/or digital signal processors that provide processing functions, as well as other calculation and control functionality. The processor 810 may be coupled to storage media (e.g., memory) 815 for storing data and software instructions for executing programmed functionality within the computing device. The memory 815 may be on-board the processor 810 (e.g., within the same integrated circuit package), and/or the memory may be external memory to the processor and functionally coupled over a data bus.

A number of software modules and data tables may reside in the memory 815 and may be utilized by the processor 810 in order to manage, create, and/or remove content from the computing device 800 and/or perform device control functionality. As illustrated in FIG. 8, in some embodiments, the memory 815 may include an application module 820 which may implement one or more applications. The functionality of the modules and/or data structures may be combined, separated, and/or be structured in different ways depending upon the implementation of the computing device 800.

The processor 810 may be configured to determine or otherwise obtain SPS timing information and position-and-velocity-assisted timing information. For example, the processor 810 may be able to obtain SPS timing information from the SPS receiver 808 as determined by the SPS receiver 808 or may be able to determine the SPS timing information from information provided by the SPS receiver 808. The SPS information may include a clock time and a timing uncertainty (i.e., the uncertainty in the clock time due to SPS signal measurement variance). The processor 810 may be configured to determine position-and-velocity-assisted (PV-assisted) timing information from position and velocity information obtained by the processor 810 from a source of position and velocity information. The source of position and velocity information may be, for example, one or more sensors disposed in the computing device 800, or one or more sensors of a navigation system external to the computing device 800, or a combination of one or more sensors of the computing device 800 and one or more sensors of a navigation system external to the computing device 800. The processor 810 may be configured to obtain the position and velocity information from a device external to the computing device 800 using a wireless communication protocol such as a Vehicle-to-Everything (V2X) wireless communication protocol such as the C-V2X wireless communication protocol.

The processor 810 may be configured to determine the PV-assisted timing information on an on-going basis or in response to a trigger condition being met. For example, the processor 810 may determine the PV-assisted timing information intermittently (e.g., periodically) in accordance with a schedule. Also or alternatively, the processor 810 may be configured to determine the PV-assisted timing information in response to a trigger condition such as a determination being made by the processor 810 that insufficient SPS signal measurements are available for solving for position and time. The processor 810 may be configured to make the determination that insufficient SPS measurements are available from which to solve for position and time. The processor 810 may respond to the determination by obtaining position and velocity information from a source of position and velocity information. The processor 810 may be configured to determine a PV-assisted timing uncertainty of a clock time determined from the position and velocity information and measurement variance for determining the position and velocity information.

The processor 810 may be configured to adjust a clock of the computing device 800 using either the SPS timing information and/or the PV-assisted timing information. The processor 810 may be configured to adjust the clock using the SPS timing information if the SPS timing uncertainty is below a timing uncertainty threshold such as a timing uncertainty threshold associated with a wireless communication protocol (e.g., 391 ns associated with the C-V2X wireless communication protocol). Thus, the processor 810 may use the SPS timing as long as the SPS timing uncertainty is below the timing uncertainty threshold, even if the PV-assisted timing uncertainty is lower than the SPS timing uncertainty. The processor 810 may be configured to adjust the clock using the PV-assisted timing information if the PV-assisted timing uncertainty is lower than the SPS tinning uncertainty and lower than the timing uncertainty threshold. The processor 810 may be configured to adjust the clock using the PV-assisted timing information if the PV-assisted timing uncertainty is lower than the SPS timing uncertainty, the PV-assisted timing uncertainty is less than the timing uncertainty threshold, and the SPS timing uncertainty is higher than the timing uncertainty threshold. The processor 810 may be configured to adjust the clock using the PV-assisted timing information if there are insufficient SPS measurements available from Which to solve for position and time and the PV-assisted timing uncertainty is less than the timing uncertainty threshold.

The application module 820 may be a process or thread running on the processor 810 of the computing device 800, which may request data from one or more other modules (not shown) of the computing device 800. Applications typically run within an upper layer of the software architectures and may be implemented in a rich execution environment of the computing device 800, and may include navigation applications, games, shopping applications, content streaming applications, web browsers, location aware service applications, etc.

The computing device 800 may further include a user interface 850 providing suitable interface systems for outputting audio and/or visual content, and for facilitating user interaction with the computing device 800. For example, the user interface 850 may comprise one or more of a microphone and/or a speaker for outputting audio content and for receiving audio input, a keypad and/or a touchscreen for receiving user inputs, and a display (which may be separate from the touchscreen or be the touchscreen) for displaying visual content.

The radar transceiver 860 may be configured to transmit radar signals and to detect reflected radar signals. The radar transceiver 860 may be used to identify objects proximate to the vehicle (in implementations where the wireless computing device 800 is in a vehicle) that may obstruct the vehicle and/or pose a collision hazard, such as but not limited to pedestrians, objects in the roadway, and/or other vehicles on the roadway. Some implementations of the computing device 800 may include multiple radar transceivers. For example, the computing device 800 may include a short-range radar (SRR) transceiver, a mid-range radar (MRR) transceiver, and a long-range radar (LRR) transceiver that are each configured to operate within a different range from the vehicle. For example, the SRR transceiver may have a range of approximately 30 meters, the MRR may have a range of approximately 100 meters, and the LRR may have a range of approximately 200 meters. These ranges are merely example of one possible combination of ranges provided by the SRR, MRR, and LRR transceivers. The actual ranges utilized by each of the transceivers may vary based on the implementation. Range information determined by the radar transceiver(s) may be provided to the navigation unit 870 for determining the position of the computing device 800.

The computing device 800 may include a LiDAR transceiver 865. The LiDAR transceiver 865 may be configured to emit laser signals and to detect reflected LiDAR signals. The LiDAR transceiver 865 may be used to identify objects proximate to the vehicle 110 that may obstruct the vehicle and/or pose a collision hazard, such as but not limited to pedestrians, objects in the roadway, and/or other vehicles on the roadway. Range information determined by the LiDAR transceiver 865 may be provided to the navigation unit 870 for determining the position of the computing device 800.

The vehicle control unit 875 may be configured to control various components of the vehicle 110 to cause the vehicle to move along a route determined by the navigation unit 870. The vehicle control unit 875 may be configured to be communicatively coupled with the navigation unit 870 and may be configured to receive information from the navigation unit 870 and to provide information to the navigation unit 870. The vehicle control unit 875 may be configured to output signals to one or more components of the vehicle to control acceleration, braking, steering, and/or other actions by the vehicle. The vehicle control unit 875 may be configured to receive information from one or more components of the vehicle and/or sensors, including the navigation unit 870, that may be used to determine a current state of the vehicle. The current state of the vehicle may include a position or location of the vehicle, a speed of the vehicle, acceleration of the vehicle, direction of travel of the vehicle, which gear the vehicle is currently configured to operate in, and/or other information regarding the state of the vehicle. In implementations where the navigation system is included in other types of autonomous or semi-autonomous device, a control unit configured to control the autonomous or semi-autonomous device may be substituted for the vehicle control unit 875.

The navigation unit 870 may be configured to obtain range information from the radar transceiver 860 and/or the LiDAR transceiver 865. The navigation unit 870 may be configured to obtain range information from other C-V2X devices proximate to the computing device 800. The navigation unit 870 may be configured to use this range information to provide navigation information to driver and/or to determine control signals to send to the vehicle control unit 875 for controlling the operation of the vehicle in which the computing device is disposed.

In some implementations, the functionality of the computing device 800 may be implemented as multiple computing devices. For example, a vehicle may include a computer system for navigation and/or vehicle control and a separate computer system for communications with other vehicles. The two computer systems may be communicably coupled and be configured to exchange data.

The navigation unit 870 and the vehicle control unit 875 may be implemented in hardware, software, or a combination thereof. The navigation unit 870 and the vehicle control unit 875 may be implemented at least in part by software executed by the trusted execution environment 880 to prevent the navigation unit 870 and the vehicle control unit 875 from being tampered with by a malicious third party that wishes to interfere with navigation of the vehicle and/or to assume control of the vehicle.

The sensor(s) 890 may comprise one or more sensors that may collect data that may be used to assist in determining a position and velocity of the computing device 800. The sensor(s) 890 may collect data that may be used by the navigation unit 870 in addition to the information received from the communication unit 805, the radar transceiver 860, and the LiDAR transceiver 865. The sensor(s) 890 may include one or more optical sensors, such as still or video cameras, that may be used to capture information about the area surrounding the vehicles, such as lane markings, signage, reflector colorations and/or patterns, the presence of objects and/or other vehicles proximate to the vehicle, and other such information. The sensor(s) 890 may include one or more accelerometers for determining a velocity of the computing device. The sensor(s) 890 may include a magnetometer or compass for determining a direction in which the vehicle is moving, or gyroscopes for measuring angular rotation of the vehicle. In implementations where the computing device 800 is disposed within a vehicle, the one or more vehicle specific sensors, such as speedometer may also be included. Furthermore, in implementations that include the radar transceiver 860, the LiDAR transceiver 865, or both, the radar and LiDAR may be used to estimate position and velocity. The radar and LiDAR transceivers may detect reflected signals from navigational markers disposed throughout a navigable environment that may provide positional information to the computing device 800. Furthermore, the combination of sensor(s) 890 and the radar and/or LiDAR may be used to perform dead reckoning in areas where the SPS signals and/or network is unavailable.

Figure 9:
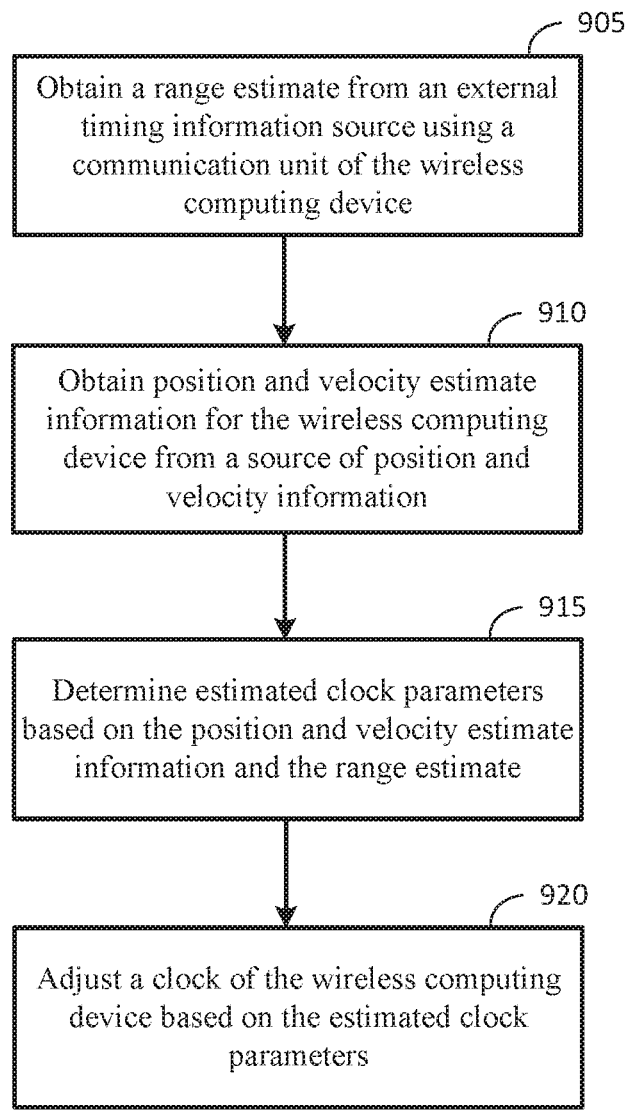
FIG. 9 is a flow diagram of an example process for maintaining timing accuracy in a wireless computing device according to the disclosure.

FIG. 9 is a flow diagram of an example process for maintaining timing accuracy in a wireless computing device according to the disclosure. The process illustrated in FIG. 9 may be implemented by the communication unit 720 of a wireless computing device. The process of FIG. 9 may be implemented in a wireless computing device that is disposed in a vehicle or may be implemented in mobile wireless computing device associated with a pedestrian, such as a smartphone, a smartwatch or other wearable computing device, and/or other mobile wireless computing device. This process may be used to maintain timing accuracy in a clock of the wireless computing device in SPS and/or network challenged areas where SPS-based or network-based time assistance information is unavailable. Techniques discussed herein may be used for wireless computing devices that have a static position and for wireless computing devices that are moving and have a dynamic position.

Figure 11:
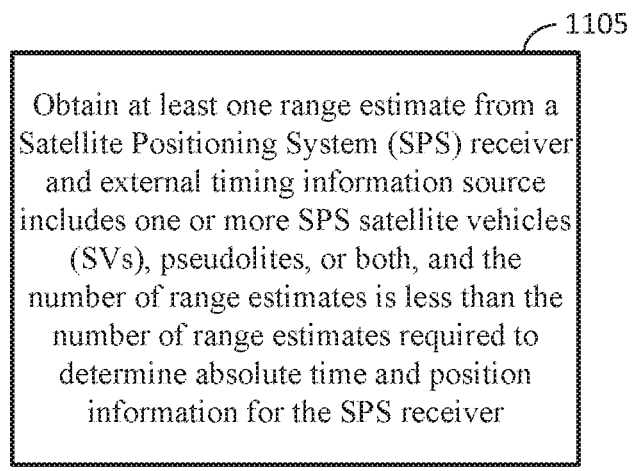
FIG. 11 is a diagram of an example process element for obtaining a range estimate from an external timing information source according to the disclosure.
Figure 14:
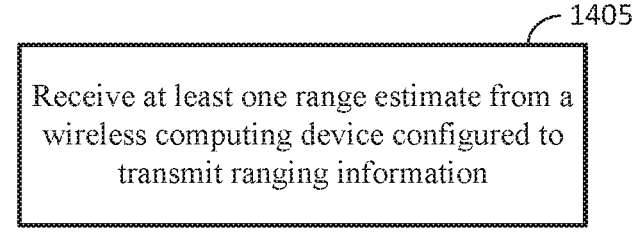
FIG. 14 is a diagram of an example process element for obtaining a range estimate from an external timing information source according to the disclosure.

A range estimate may be obtained from an external timing information source using a communication unit of the wireless computing device (stage 905). The range estimate may be provided to the wireless computing device in a communication. The range estimate may be obtained by calculation using one or more received signals from an external timing information source at a known location. As discussed in the preceding examples, an example of such an external timing information source may be an SPS SV. The SPS receiver 725 of the communication unit 720 of the wireless device may acquire a signal from an SPS SV and determine a pseudorange estimate for that SPS SV. Another example of the external timing information source is a pseudolite. The SPS receiver may acquire a signal from a pseudolite and determine a pseudorange estimate to the pseudolite. The SPS receiver may use one or more pseudolites in addition to or instead of one or more signals from SPS SVs to determine range estimates. An example process for acquiring a range estimate using an SPS receiver is illustrated in FIG. 11. Another type of external timing information source may be another wireless computing device that has a known location. An example process for acquiring a range estimate from another wireless computing device is illustrated in FIG. 14.

Position and velocity estimate information for the wireless computing device may be obtained from a source of position and velocity information (stage 910). The source of position and velocity information is separate from the external timing information source. As discussed in the preceding examples, the source of position and velocity information may comprise one or more sensors configured to determine a position and velocity of the wireless computing device. The one or more sensors may be in the wireless computing device and/or external to the wireless computing device (e.g., in a navigation system). If the source is external to the wireless computing device, the position and velocity information may be received, for example, by the wireless computing device using a communication unit using a Vehicle-to-Everything wireless communication protocol (such as C-V2X). In some implementations, such as in the example illustrated in FIG. 7, the wireless computing device may be disposed in a vehicle and the functionality of the source of position and velocity estimate information 705 may be an onboard computing system, a navigation system, a vehicle control system, or a combination thereof. In some implementations, the functionality of the source of position and velocity information may be implemented by the communication unit 720. For example, the communication unit 720 may include or be communicably coupled to one or more sensors that may be used to determine the position and the velocity of the wireless computing device. In some implementations, the wireless computing device may be a smartphone, smartwatch, or other such mobile device that includes one or more sensors that may be used to determine the position and the velocity of the wireless computing device. Such a device might be used by a pedestrian for V2P communications in an operating environment in which C-V2X is used to exchange information between various road users.

Estimated clock parameters may be determined based on the position and velocity estimate information and the range estimate (stage 915). The communication unit 720 may solve for various parameters, including but not limited to one or more of an estimated clock state, an estimated clock bias value, and an estimated clock drift. The estimated clock state is an estimated value of what the clock state should be at the time that the estimate (i.e., an estimate of what the clock state should be if the clock state had remained synchronized with the reference clock). The estimated clock bias is the difference between the estimate of time of the communication unit 720 and the reference time maintained by the SPS system or the wireless communication network. The estimated clock drift is the estimated difference between the rate of the reference clock and rate of the clock of the communication unit 720. The communication unit 720 may solve for the unknown time parameters using the known position and velocity of the communication unit 720 obtained in stage 910 and the range estimate from the external timing information source which is also at a known location.

If a range estimate is acquired for more than one external timing information source, then the communication unit 720 may perform stage 915 for each of the range estimates obtained. The communication unit 720 may average the clock parameters determined for each of the range estimates to determine clock parameters to be used in stage 920. Alternatively, the communication unit 720 may determine a weighted average of the clock parameters determined for each of the range estimates to determine clock parameters to be used in stage 920. The weight associated with each of the range estimates may be determined based on an estimated accuracy of each of the range estimates, such that range estimates that have a higher accuracy are weighted more heavily.

A clock of the wireless computing device may be updated based on the estimated clock parameters (stage 920). The clock may be adjusted in response to a PV-assisted timing uncertainty corresponding to the clock parameters being below a timing uncertainty threshold. The communication unit 720 may adjust the clock of the receiver based on the clock bias value and/or the clock drift value determined in stage 915, or the communication unit may compensate for the clock of the receiver based on the clock bias value and/or the clock drift value rather than actually adjusting the clock. The communication unit 720 may periodically adjust and/or further compensate for the clock of the communication unit 720 to compensate for estimated drift in an attempt to keep the clock of the communication unit 720 synchronized as closely with the reference clock as possible. The clock may be adjusted in response to the PV-assisted timing uncertainty being lower than an SPS timing uncertainty, or in response to the PV-assisted timing uncertainty being lower than an SPS timing uncertainty and the SPS timing uncertainty being high than the timing uncertainty threshold, or in response to insufficient SPS measurements being available from which to solve for position and time.

Figure 10:
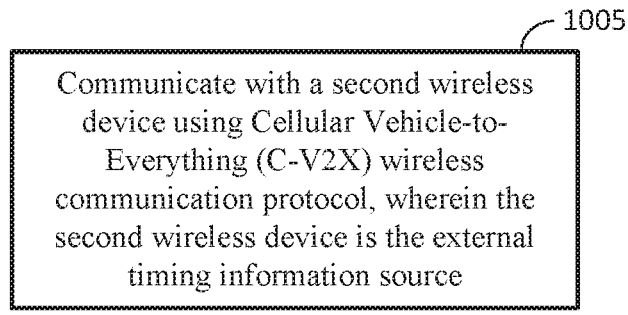
FIG. 10 is a diagram of an example process element for communicating with a second wireless computing device according to the disclosure.

FIG. 10 is a diagram of an example process element for communicating with a second wireless computing device according to the disclosure. The process element illustrated in FIG. 10 may be implemented by the communication unit 720 of a wireless computing device. The process element illustrated in FIG. 10 may provide an additional stage to the process illustrated in FIG. 9.

The wireless computing device may communicate with a second wireless device using Cellular Vehicle-to-Everything (C-V2X) wireless communication protocol (stage 1005). The communication unit 720 of the wireless computing device may communicate with the second wireless device using one of the wireless C-V2X communication protocols. The second wireless device may be another vehicle or a component thereof, and the wireless computing device may communicate with the second wireless computing device using a V2V protocol. The second wireless device may be an infrastructure element disposed in an environment in which the wireless device is operating, and the wireless computing device may communicate with the second wireless computing device using a V2I protocol. The second wireless device may be a wireless computing device associated with a pedestrian in the environment in which the wireless device is operating, and the wireless computing device may communicate with the second wireless computing device using a V2P protocol. The second wireless device may be the external timing information source from which the range estimate was obtained in stage 905 of the process of FIG. 9.

FIG. 11 is a diagram of an example process element for obtaining a range estimate from an external timing information source according to the disclosure. The process element illustrated in FIG. 11 may be implemented by the communication unit 720 of a wireless computing device. The process element illustrated in FIG. 11 may be used to implement, at least in part, stage 905 of the process illustrated in FIG. 9.

At least one range estimate may be obtained from a Satellite Positioning System (SPS) receiver and external timing information source that may include one or more SPS space vehicles (SVs), pseudolites, or both. The number of range estimates available from (e.g., already obtained by) the SPS receiver may be less than the number of range estimates required to determine absolute time and position information for the SPS receiver (stage 1105). The external timing information source may be one or more SPS space vehicle (SVs), one or more pseudolites, or a combination of one or more SVs and one or more pseudolites and the SPS receiver 725 of the communication unit 720 may be configured to obtain the at least one range estimate. The SPS receiver 725 may acquire a signal from an SV or pseudolite and determine a pseudorange using various means known in the art. The signals transmitted by the SPS SVs and pseudolites include a time indicating a time at which the signal was transmitted. The pseudorange to an SV or pseudolite may be determined by multiplying the time that the signal has taken to reach the SPS receiver 725 by the speed of light to determine the pseudorange.

Figure 12:
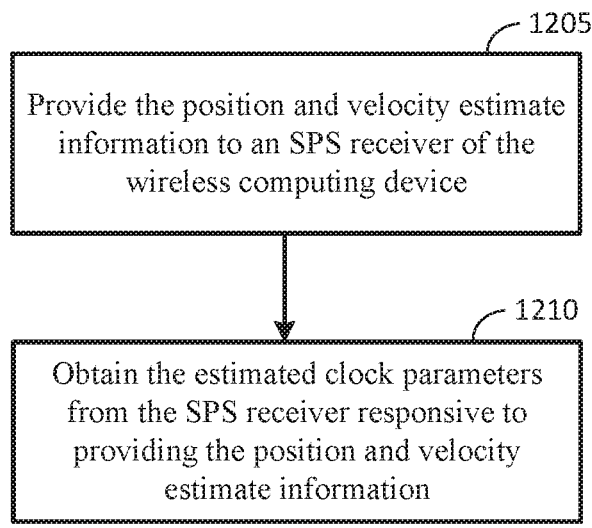
FIG. 12 is a flow diagram of an example process for determining estimated clock parameters based on the position and velocity estimate information and the range estimate according to the disclosure.

FIG. 12 is a flow diagram of an example process for determining estimated clock parameters based on the position and velocity estimate information and the range estimate according to the disclosure. The process illustrated in FIG. 12 may be implemented by the communication unit 720 of a wireless computing device. The process illustrated in FIG. 12 may be used to implement, at least in part, stage 915 of the process illustrated in FIG. 9.

The position and velocity estimate information may be provided to an SPS receiver of the wireless computing device (stage 1205). In some implementations, the SPS receiver 725 may receive the position and velocity estimates for the position of the wireless computing device. The position and velocity information may be obtained using sensor data as discussed in the preceding examples. The SPS receiver may acquire at least one signal from an SPS SV and/or a pseudolite and obtain time information from the at least one signal. The positions of the SV and/or pseudolite are known as is the position of the wireless computing device. Accordingly, the SPS receiver 725 may solve for the unknown time value (i.e., what the time should be at the receiver) and use that information to correct the clock of the communication unit 720. The SPS receiver 725 may compare the clock of the receiver of the communication unit 720 with the time information to determine an estimated clock state, an estimated clock bias, and an estimated clock drift.

The estimated clock parameters may be obtained from the SPS receiver responsive to providing the position and velocity estimate information (stage 1210). The SPS receiver 725 may output the estimated clock parameters and the communication unit 720 may use the estimated clock parameters to adjust the clock of the wireless computing device. An example process element for adjusting the clock of the wireless computing device is illustrated in FIG. 13.

Figure 13:
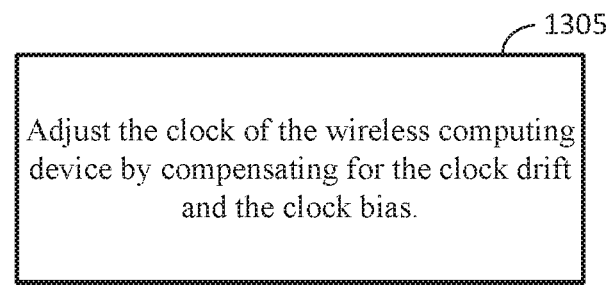
FIG. 13 is a diagram of an example process element for updating a clock of the wireless computing device based on the estimated clock parameters according to the disclosure.

FIG. 13 is a diagram of an example process element for adjusting a clock of the wireless computing device based on the estimated clock parameters according to the disclosure. The process element illustrated in FIG. 13 may be implemented by the communication unit 720 of a wireless computing device. The process element illustrated in FIG. 13 may be used to implement, at least in part, stage 920 of the process illustrated in FIG. 9.

The clock of the wireless computing device may be adjusted to compensate for the clock drift and the clock bias (stage 1305). The clock of the communication unit 720 may be adjusted to compensate for the clock drift and clock bias determined for the clock of the receiver using techniques disclosed herein. By adjusting for the clock bias and the clock drift, the clock of the wireless computing device may remain in sync with a reference clock for a longer period of time where an SPS-based or network-based reference clock state is unavailable. The process illustrated in FIG. 9 may be repeated by the wireless device periodically to obtain new estimated clock state, and the process element illustrated in FIG. 13 may be used to adjust the clock of the communication unit 720 based on that clock state.

FIG. 14 is a diagram of an example process element for obtaining a range estimate from an external timing information source according to the disclosure. The process element illustrated in FIG. 14 may be implemented by the communication unit 720 of a wireless computing device. The process element illustrated in FIG. 14 may be used to implement, at least in part, stage 905 of the process illustrated in FIG. 9.

At least one range estimate may be obtained from a second wireless computing device configured to transmit ranging information (stage 1405). As discussed in the preceding examples, a wireless computing device at a known location may provide ranging information that may be used by the communication unit 720 to determine estimated clock parameter that may be used to keep the clock in sync with a reference clock. The second wireless computing device may comprise a mobile device that is configured to use C-V2X and may be associated with an infrastructure element (V2I), a vehicle (V2V), or a pedestrian (V2P). The second wireless device may be configured to transmit ranging information that may be used by devices receiving the ranging information to estimate how far the second wireless is from the device receiving the ranging information. The ranging information may include position information for the second wireless device and information identifying a time at which the data was transmitted. A wireless device receiving the ranging information and position and velocity information for the wireless device may use this information to derive estimated time parameters that may be used to keep the clock of the wireless device synchronized with a time reference, which may enable the wireless computing device to be used with wireless communication protocols that have strict time synchronization requirements even where SPS-based and/or network-based time references are unavailable.

If implemented in part by hardware or firmware a long with software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations may be performed in parallel or concurrently. In addition, the order of the operations may be rearranged. A process may have additional stages not included in the figure.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Components, functional or otherwise, shown in the figures and/or discussed herein as being connected or communicating with each other are communicably coupled. That is, they may be directly or indirectly connected to enable communication between them.

What is claimed is:

1. A mobile device comprising:
   a communication unit;
   a memory; and
   a processor communicably coupled to the communication unit and the memory, the processor being configured to:
   obtain a range estimate from a signal received, via the communication unit, from a timing information source;
   obtain position and velocity estimate information for the mobile device from a source of position and velocity estimate information separate from the timing information source, the processor being configured to obtain the position and velocity estimate information from at least one sensor of the mobile device, or being configured to obtain the position and velocity estimate information via the communication unit using a Vehicle-to-Everything (V2X) wireless communication protocol, or a combination thereof;
   determine estimated clock parameters based on the position and velocity estimate information and the range estimate; and
   adjust a clock of the mobile device based on the estimated clock parameters in response to a position-and-velocity-assisted timing uncertainty corresponding to the estimated clock parameters being below a timing uncertainty threshold;
   wherein the estimated clock parameters comprise clock drift and clock bias, both associated with the clock of the mobile device, and wherein to adjust the clock of the mobile device, the processor is configured to compensate for the clock drift and the clock bias.

2. The mobile device of claim 1, wherein:
   the processor is configured to adjust the clock of the mobile device in response to the position-and-velocity-assisted timing uncertainty being lower than a satellite positioning system (SPS) timing uncertainty; or
   the processor is configured to adjust the clock of the mobile device in response to the position-and-velocity-assisted timing uncertainty being lower than the SPS timing uncertainty and the SPS timing uncertainty being higher than the timing uncertainty threshold; or
   the processor is configured to adjust the clock of the mobile device in response to insufficient SPS measurements being available from which to solve for position and time.

3. The mobile device of claim 1, wherein the processor is configured to make a determination that insufficient satellite measurements are available from which to solve for position and time, and the processor is configured to obtain the position and velocity estimate information in response to the determination.

4. The mobile device of claim 1, wherein the V2X wireless communication protocol is a Cellular Vehicle-to-Everything (C-V2X) wireless communication protocol, the timing uncertainty threshold is associated with the C-V2X wireless communication protocol, and the processor is further configured to communicate with the timing information source using the C-V2X wireless communication protocol subsequent to adjusting the clock of the mobile device.

5. The mobile device of claim 1, wherein the communication unit comprises a Satellite Positioning System (SPS) receiver communicably coupled with the processor, and wherein the timing information source comprises one or more SPS satellite vehicles (SVs), one or more pseudolites, or a combination thereof, and wherein the processor is configured to obtain the range estimate from the SPS receiver and to adjust the clock of the mobile device without requiring solving for position by the SPS receiver.

6. The mobile device of claim 1, wherein the source of position and velocity estimate information comprises a navigation system.

7. A method for maintaining timing accuracy in a mobile device, the method comprising:
   obtaining a range estimate using a signal received from a timing information source via a communication unit of the mobile device;
   obtaining position and velocity estimate information for the mobile device from a source of position and velocity information separate from the timing information source, the position and velocity estimate information being obtained from at least one sensor of the mobile device, or via the communication unit of the mobile device using a Vehicle-to-Everything wireless communication protocol, or a combination thereof;
determining estimated clock parameters based on the position and velocity estimate information and the range estimate; and
adjusting a clock of the mobile device based on the estimated clock parameters in response to a position-and-velocity-assisted timing uncertainty corresponding to the estimated clock parameters being below a timing uncertainty threshold;
wherein the estimated clock parameters comprise clock drift and clock bias associated with the clock of the mobile device, and wherein adjusting the clock of the mobile device comprises compensating for the clock drift and the clock bias.

8. The method of claim 7, wherein adjusting the clock of the mobile device is performed in response to:
the position-and-velocity-assisted timing uncertainty being lower than a satellite positioning system (SPS) timing uncertainty; or
the position-and-velocity-assisted timing uncertainty being lower than the SPS timing uncertainty and the SPS timing uncertainty being higher than the timing uncertainty threshold; or
insufficient SPS measurements being available from which to solve for position and time.

9. The method of claim 7, further comprising making a determination that insufficient satellite measurements are available from which to solve for position and time, wherein obtaining the position and velocity estimate information is performed in response to the determination.

10. The method of claim 7, wherein the V2X wireless communication protocol is a Cellular Vehicle-to-Everything (C-V2X) wireless communication protocol and the timing uncertainty threshold is associated with the C-V2X wireless communication protocol.

11. The method of claim 10, further comprising communicating with another mobile device using the C-V2X wireless communication protocol subsequent to adjusting the clock of the mobile device.

12. The method of claim 7, wherein the timing information source comprises one or more Satellite Positioning System (SPS) satellite vehicles (SVs), one or more pseudolites, or a combination thereof, and wherein obtaining the range estimate comprises an SPS receiver of the mobile device determining a number of range estimates from a number of SVs, pseudolites, or both, that is less than the number of range estimates required to determine absolute time and position information for the SPS receiver.

13. The method of claim 7, wherein the position and velocity estimate information is obtained from one or more sensors of the mobile device.

14. The method of claim 7, wherein the position and velocity estimate information is obtained from one or more sensors of a navigation system of a vehicle in which the mobile device is disposed.

15. A mobile device comprising:
means for obtaining a range estimate from a timing information source at a known location using a communication unit of the mobile device;
means for obtaining position and velocity estimate information, for the mobile device from a source of position and velocity estimate information separate from the timing information source, from at least one sensor of the mobile device, or using a Vehicle-to-Everything (V2X) wireless communication protocol, or a combination thereof;
means for determining estimated clock parameters based on the position and velocity estimate information and the range estimate; and
means for adjusting a clock of the mobile device based on the estimated clock parameters in response to a position-and-velocity-assisted timing uncertainty corresponding to the estimated clock parameters being below a timing uncertainty threshold;
wherein the estimated clock parameters comprise clock drift and clock bias associated with the clock of the mobile device, and wherein the means for adjusting the clock of the mobile device comprise means for compensating for the clock drift and the clock bias.

16. The mobile device of claim 15, wherein:
the means for adjusting are for adjusting the clock of the mobile device in response to the position-and-velocity-assisted timing uncertainty being lower than a satellite positioning system (SPS) timing uncertainty; or
the means for adjusting are for adjusting the clock of the mobile device in response to the position-and-velocity-assisted timing uncertainty being lower than the SPS timing uncertainty and the SPS timing uncertainty being higher than the timing uncertainty threshold; or
the means for adjusting are for adjusting the clock of the mobile device in response to insufficient SPS measurements being available from which to solve for position and time.

17. The mobile device of claim 15, further comprising means for making a determination that insufficient Satellite Positioning System (SPS) measurements are available from which to solve for position and time, wherein the means for obtaining the position and velocity estimate information are for obtaining the position and velocity estimate information in response to the determination.

18. The mobile device of claim 15, wherein the V2X wireless communication protocol is a Cellular Vehicle-to-Everything (C-V2X) wireless communication protocol, the mobile device further comprising:
means for communicating with the timing information source using C-V2X subsequent to adjusting the clock of the mobile device.

19. The mobile device of claim 15, wherein the timing information source comprises one or more Satellite Positioning System (SPS) satellite vehicles (SVs), one or more pseudolites, or a combination thereof, wherein the means for obtaining the range estimate are for obtaining the range estimate from an SPS receiving means of the mobile device, and wherein the means for adjusting the clock are for adjusting the clock without requiring solving for position by the SPS receiving means.

20. The mobile device of claim 15, wherein the source of position and velocity information comprises one or more sensing means for determining position and velocity of the mobile device.

21. A non-transitory, computer-readable medium, having stored thereon computer-readable instructions for maintaining timing accuracy in a mobile device, comprising instructions configured to cause a computer to:
obtain a range estimate from a timing information source at a known location using a communication unit of the mobile device;
obtain position and velocity estimate information for the mobile device from a source of position and velocity estimate information separate from the timing information source, the instructions being configured to cause the computer to obtain the position and velocity estimate information from at least one sensor of the mobile device, or being configured to cause the computer to obtain the position and velocity estimate information via the communication unit using a Vehicle-to-Everything (V2X) wireless communication protocol, or a combination thereof;

determine estimated clock parameters based on the position and velocity estimate information and the range estimate; and adjust a clock of the mobile device based on the estimated clock parameters in response to a position-and-velocity-assisted timing uncertainty corresponding to the estimated clock parameters being below a timing uncertainty threshold;

wherein the estimated clock parameters comprise clock drift and clock bias, both associated with the clock of the mobile device, and the instructions configured to cause the computer to adjust the clock of the mobile device are configured to cause the computer to compensate for the clock drift and the clock bias.

22. The computer-readable medium of claim 21, wherein:

the instructions configured to cause the computer to adjust the clock of the mobile device are configured to cause the computer to adjust the clock of the mobile device in response to the position-and-velocity-assisted timing uncertainty being lower than a satellite positioning system (SPS) timing uncertainty; or the instructions configured to cause the computer to adjust the clock of the mobile device are configured to cause the computer to adjust the clock of the mobile device in response to the position-and-velocity-assisted timing uncertainty being lower than the SPS timing uncertainty and the SPS timing uncertainty being higher than the timing uncertainty threshold; or the instructions configured to cause the computer to adjust the clock of the mobile device are configured to cause the computer to adjust the clock of the mobile device in response to insufficient SPS measurements being available from which to solve for position and time.

23. The computer-readable medium of claim 21, further comprising instructions configured to cause the computer to make a determination that insufficient satellite measurements are available from which to solve for position and time, and the instructions configured to cause the computer to obtain the position and velocity estimate information are configured to cause the computer to obtain the position and velocity estimate information in response to the determination.

24. The computer-readable medium of claim 21, wherein the V2X wireless communication protocol is a Cellular Vehicle-to-Everything (C-V2X) wireless communication protocol, the timing uncertainty threshold is associated with the C-V2X wireless communication protocol, and the computer-readable medium further comprises instructions configured to cause the computer to communicate with the timing information source using the C-V2X wireless communication protocol subsequent to adjusting the clock of the mobile device.

25. The computer-readable medium of claim 21, wherein the timing information source comprises one or more Satellite Positioning System (SPS) satellite vehicles (SVs), one or more pseudolites, or a combination thereof, wherein the instructions configured to cause the computer to obtain the range estimate are configured to cause the computer to obtain the range estimate from an SPS receiver, and wherein the instructions configured to cause the computer to adjust the clock of the mobile device are configured to cause the computer to adjust the clock of the mobile device without requiring solving for position by the SPS receiver.

* * * * *